(12) United States Patent
Wraback et al.

(10) Patent No.: US 8,203,127 B2
(45) Date of Patent: Jun. 19, 2012

(54) TERAHERTZ RADIATION DEVICE USING POLAR SEMICONDUCTOR MATERIALS AND METHOD OF GENERATING TERAHERTZ RADIATION

(75) Inventors: Michael Wraback, Germantown, MD (US); Paul H Shen, Potomac, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/079,097

(22) Filed: Apr. 4, 2011

(65) Prior Publication Data

US 2011/0180733 A1    Jul. 28, 2011

(51) Int. Cl.
  *H01L 33/04* (2010.01)
  *H01L 33/28* (2010.01)
  *H01L 33/32* (2010.01)
(52) U.S. Cl. ............. 250/504 R; 250/504 H; 250/493.1; 250/495.1; 257/12; 257/13
(58) Field of Classification Search .............. 250/504 R, 250/504 H, 493.1, 495.1; 257/12, 13
See application file for complete search history.

(56) References Cited

U.S. PATENT DOCUMENTS

| | | | | |
|---|---|---|---|---|
| 5,789,750 A * | 8/1998 | Nuss | ........................... | 250/338.1 |
| 6,472,683 B1 * | 10/2002 | Li | ................................... | 257/25 |
| 6,621,841 B1 * | 9/2003 | Soref et al. | ................. | 372/43.01 |
| 6,828,558 B1 * | 12/2004 | Arnone et al. | ............. | 250/341.1 |
| 7,091,506 B2 * | 8/2006 | Zhang et al. | ............... | 250/504 R |
| 7,335,908 B2 | 2/2008 | Samuelson et al. | | |
| 7,550,734 B1 * | 6/2009 | Lee et al. | ................. | 250/370.12 |
| 7,693,571 B2 * | 4/2010 | Arnone et al. | ................ | 600/473 |
| 7,767,968 B2 * | 8/2010 | Youngner et al. | ........ | 250/339.06 |
| 7,919,764 B2 * | 4/2011 | Metcalfe et al. | .......... | 250/504 R |
| 8,050,531 B2 * | 11/2011 | Rahman et al. | ............... | 385/142 |
| 2004/0262544 A1 * | 12/2004 | Zhang et al. | ................ | 250/493.1 |
| 2007/0282206 A1 * | 12/2007 | Arnone et al. | ................ | 600/473 |
| 2008/0099698 A1 * | 5/2008 | Rahman et al. | ............ | 250/493.1 |
| 2010/0006780 A1 * | 1/2010 | Metcalfe et al. | .......... | 250/504 R |
| 2011/0180733 A1 * | 7/2011 | Wraback et al. | .......... | 250/504 R |
| 2011/0198515 A1 * | 8/2011 | Wraback et al. | .......... | 250/504 R |

OTHER PUBLICATIONS

Turchinovich, "Ultrafast Polarization Dynamics in Biased Quantum Wells Under Strong Optical Excitation," Physical Review B 68, 241307(R) (2003).
Zhang, et al. "Optically Induced Femtosecond Electromagnetic Pulses from GaSbi/ AlSb Strained Layer Superlattices" Appl. Phys, Lett 57 (8), Aug. 20, 1990, pp. 753-755.
Zhang, et al. "Optoelectronic Measurement of Semiconductor Surfaces and Interfaces with Femtosecond Optics," J. Appl. Phys. 71 (1), Jan. 1, 1992, pp. 326-338.
A. Nahata, et al., "Coherent Detection Freely Propagating Terahertz Radiation by Electro-optic Sampling," Appl. Phys. Lett. 68 (2) pp. 150-152, Jan. 8, 1996.

(Continued)

*Primary Examiner* — David A Vanore
(74) *Attorney, Agent, or Firm* — Lawrence E. Anderson

(57) ABSTRACT

A method and device for generating terahertz radiation comprising a plurality of layers of polar crystal material operative to emit terahertz radiation; the plurality of layers comprising transport layers and divider layers, the plane of the layers being not parallel to the polar axis, the interface between the transport layers and divider layers forming boundaries at which the internal electric polarization terminates leading to charges accumulating at the boundaries, and creation of internal electric fields oriented along the polar axis.

20 Claims, 15 Drawing Sheets

OTHER PUBLICATIONS

F. Bernardini, V. Fiorentini, and D. Vanderbilt, "Spontaneous polarization and piezoelectric constants of III-V nitrides," Phys. Rev. B 56(16), R10024-27 (1997).

D. Turchinovich, B. S. Monozon, and P. Uhd Jepson, "Role of dynamical screening in excitation kinetics of biased quantum wells: Nonlinear absorption and ultrabroadband terahertz emission," J. Appl. Phys. 99, 013510 (2006).

J. Wu, W. Walukiewicz, K. M. Yu, J. W. Ager III, E. E. Haller, H. Lu, W. J. Schaff, Y. Saito, and Y. Nanishi, "Unusual properties of the fundamental band gap of InN," Appl. Phys. Lett. 80, 3967 (2002).

G. Koblmüller, C. S. Gallinat, S. Bernardis, J. S. Speck, G. D. Chern, E. D. Readinger, H. Shen, and M. Wraback, "Optimization of the surface and structural quality of N-face InN grown by molecular beam epitaxy," Appl. Phys. Lett. 89, 071902 (2006).

C. S. Gallinat, G. Koblmüller, J. S. Brown, S. Bernardis, J. S. Speck, G. D. Chern, E. D. Readinger, H. Shen, and M. Wraback, "In-polar InN grown by plasma-assisted molecular beam epitaxy," Appl. Phys. Lett. 89, 032109 (2006).

T. Takeuchi, S. Sota, M. Katsuragawa, M. Komori, H. Takeuchi, H. Amano, and I. Akasake, "Quantum-Confined Stark Effect due to Piezoelectric Fields in GaInN Strained Quantum Wells," Jpn. J. Appl. Phys., Part 2 36, L382 (1997).

F. Della Sala, A. DiCarlo, P. Luigi, F. Bernardini, V. Fiorentini, R. Scholz, and J.-M. Jancu, "Free-carrier screening of polarization fields in wurtzite GaN/InGaN laser structures," Appl. Phys. Lett. 74, 2002 (1999).

G. D. Chern, E. D. Readinger, H. Shen, M. Wraback, C. S. Gallinat, G. Koblmuller, and J. S. Speck, "Excitation wavelength dependence of terahertz emission from InN and InAs," Appl. Phys. Lett. 89. 141115 (2006).

K. Liu, J. Xu, T. Yuan, and X.-C. Zhang, "Terahertz radiation from InAs induced by carrier diffusion and drift," Phys. Rev. B 73, 155330 (2006).

T. Tansky et al, "Optical Band Gap of Indium Nitride," J. Appl. Phys. 59, 3241 (1986).

Ahn, H. et al, "Intense terahertz emission from a-plane IoN surface," Applied Physics Letters, vol. 92, Issue 10, id. 102103-1 to 102103-3 (2008).

S. Hoffman, et al., "Generation of Terahertz Radiation with Two Color Semiconductor Lasers," Laser & Photon. Rev. No. 1, 44-56 (2007).

D. H. Austin, "Picosecond optoelectronics switching and gating in silicon," Appl. Phys. Lett. 26, No. 3, pp. 101-103, (1975).

O. Ambacher, et al., "Pyroelectic properties of Al(In)GaN/GaN hetero- and quantum well structures," J. Phy. Condens. Matter 14 3399-3434 (2002).

J. Shan, et al. "Origin of magnetic field enhancement in the generation of terahertz radiation from semiconductor surfaces," Optics Letters, vol. 26, Issue 11, pp. 849-851 (Jun. 2001).

G.F. Neumark, "Thoery of the Anomalous Photovoltaic Effect of ZnS," Physical Review, 125:838 (1962).

A.J. Grachev, et al., "On the macroscopic and microscopic origin of the photocoltaic effect in YBCO thin films," Physica C 288 (1997).

S. Juillaguet, et al. "Cathodoluminesccence investigation of stacking faults extension in 4H-SiC," Physica Status Solida (A)204, No. 7, (2007) 2222-2228.

J.A. Majewski, et al., "Polarization and band offsets of stacking faults in AlN and GaN," MRS Internet, J. Nitride Semicond. Res. 3, 21 (1998).

J.A. Majewski, et al. Phys. Stat. Sol. "Novel Nitride Devices Based on Polarization Fields," A 179, 285 (2000).

M.D. Craven, et al, "Microstructural evoluation of a-plane GaN grown on a-plane SiCby metalorganic chemical vapor deposition," Applied Physics Letters, vol. 84, No. 8 23 1281 (2004).

B.A. Haskell, et al. "Microstructure and enhanced morphology of planar nonpolar m-plane GaN grown by hydride vapor phase epitaxy," J. Electron. Mater. 34, 357 (2005).

M. Tani, et al., "Emission characteristics of photoconductive antennas based on low-temperature-grown GaAs and semi-insulating GaAs" Appl. Opt. 36, 7853 (1997).

K. Sakai editor, "Terahertz Optoelectronics, Topics Applied Physics," "Introduction to Terhertz Pulses," by Sakai, pp. 1-30 and "TerahertzRadiation From Semiconductor Surfaces," by Ping Gu, et al., pp. 63-97, published by Springer (2005).

H. Iwata, U. Lindefelt, S. Oberg, and P. R. Briddon, "Localized electronic states around stacking faults in silicon carbide," Phys. Rev. B 65(3), 033203 (2002).

M.B. Johnston, "Simulation of Terahertz Generation at Semiconductor Surfaces," Physical Review 8, vol. 65, 165301 (65 165301-1) (2002).

Z.W. Yan, "Intermediate-Coupling Polaron Properties in Wurtzite Nitride Semiconductors," Physics Letters A, vol. 326, Issues 1-2, pp. 157-165, May 31, 2004.

S. Juillaguet, et al., "Screening the Built-in Electric Field in 4H SiC Stacking Faults," App. Phys. Letters 90, 11902 (2007).

\* cited by examiner

LT-GaAs photoconductive switch

• In-plane transport better for outcoupling THz*

Terahertz Generation
Mechanism in bulk InN (Prior Art)

- photo-Dember effect - difference between carrier mobilities
- screening due to background or bulk carriers $n_{bulk}$ $$J_{net} = J_{diffusion} + J_{bulk}$$

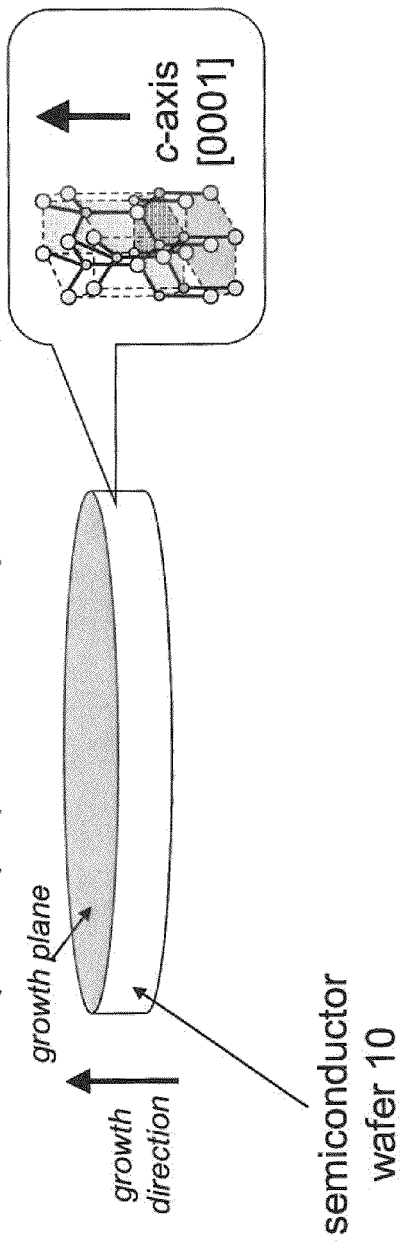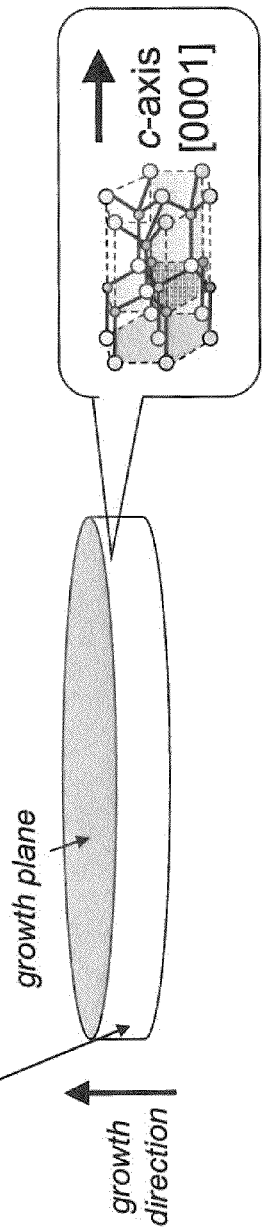
FIG. 4A – Orientation of Crystal Structure (C-axis) Comparison of Polar and non-polar material

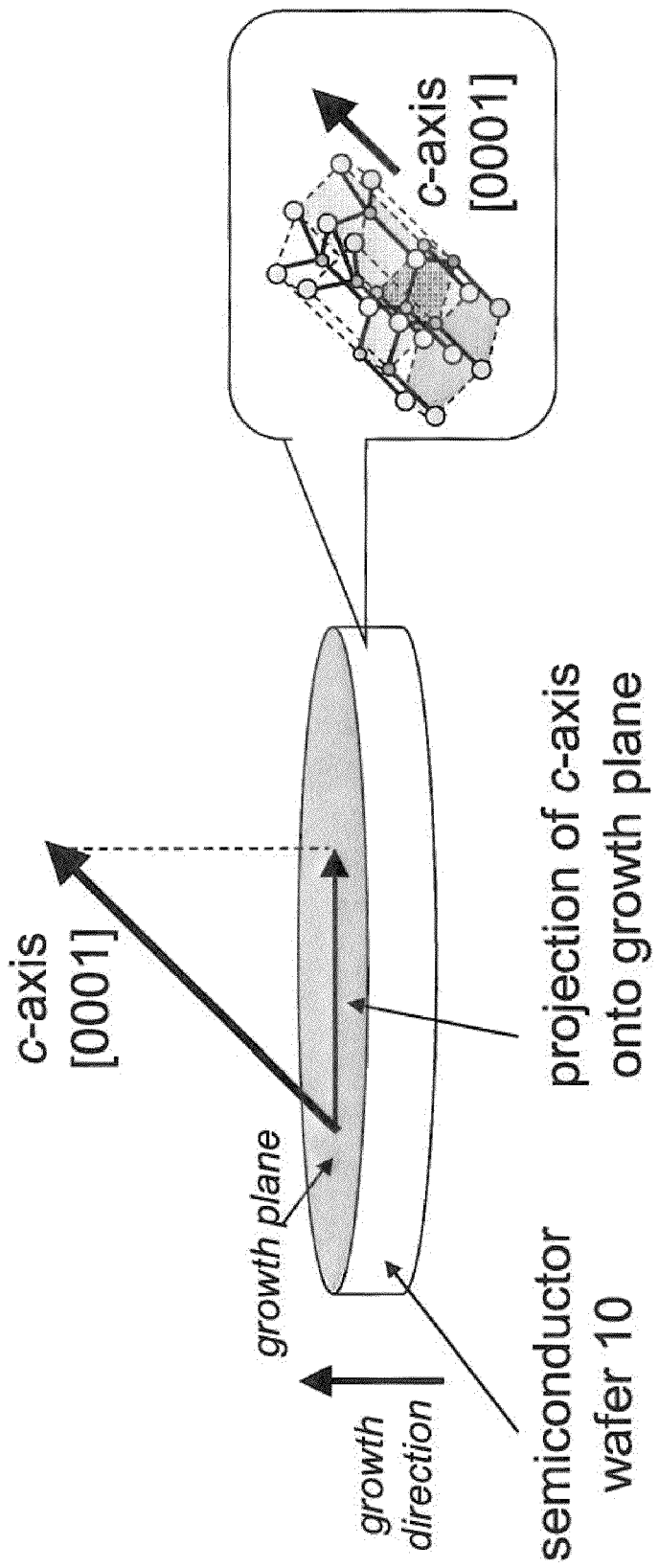
FIG. 4B – Orientation of Crystal Structure (C-axis) Semipolar material
Semi-polar: c-axis has a projection onto the growth plane

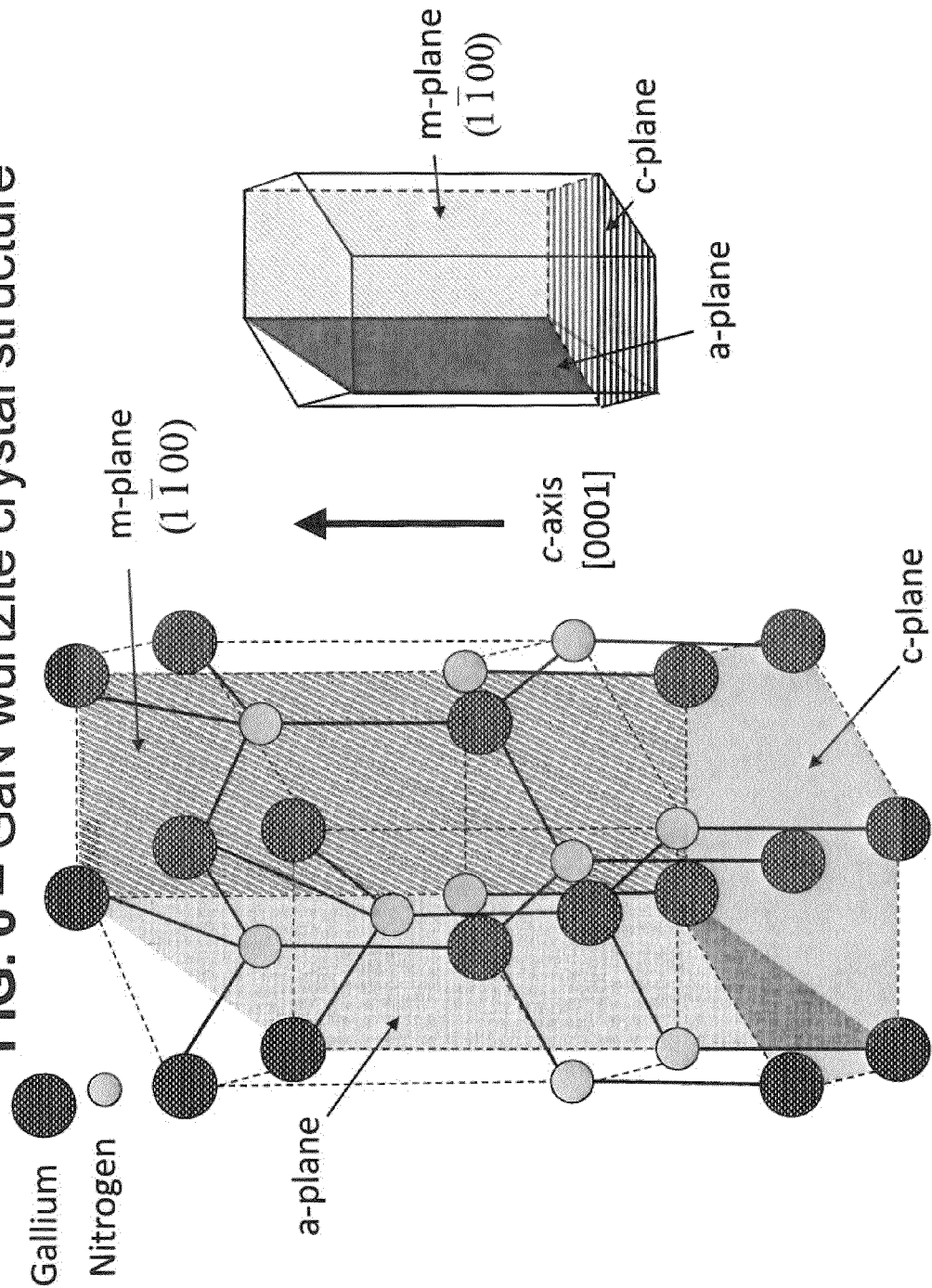
FIG. 6 – GaN wurtzite crystal structure

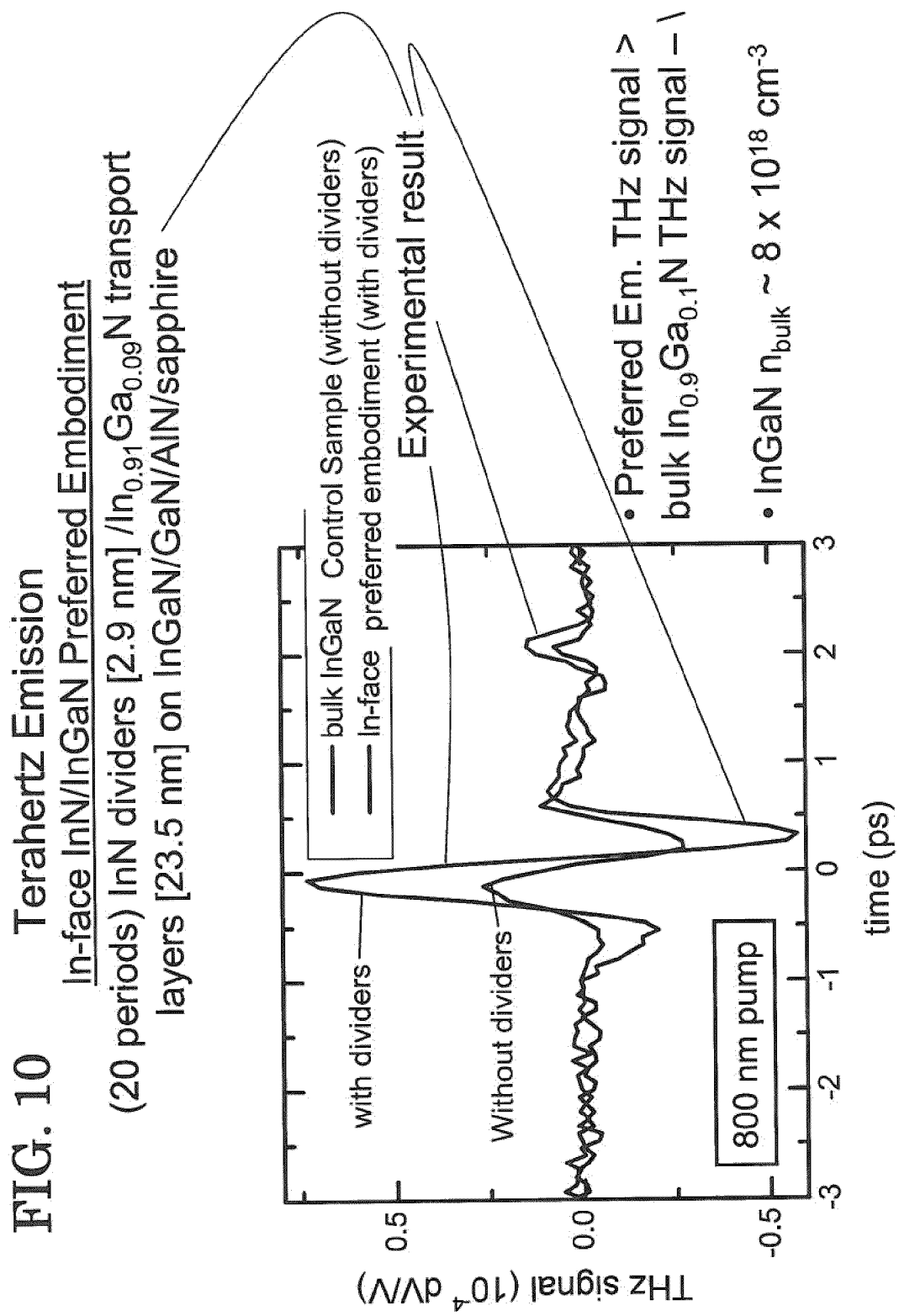
FIG. 10 Terahertz Emission
In-face InN/InGaN Preferred Embodiment
(20 periods) InN dividers [2.9 nm] / $In_{0.91}Ga_{0.09}N$ transport layers [23.5 nm] on InGaN/GaN/AlN/sapphire
- Preferred Em. THz signal > bulk $In_{0.9}Ga_{0.1}N$ THz signal
- InGaN $n_{bulk}$ ~ $8 \times 10^{18}$ cm$^{-3}$

TERAHERTZ RADIATION DEVICE USING POLAR SEMICONDUCTOR MATERIALS AND METHOD OF GENERATING TERAHERTZ RADIATION

GOVERNMENT INTEREST

The invention described herein may be manufactured, used, and/or licensed by or for the United States Government.

CROSS-REFERENCE TO RELATED APPLICATIONS

This application claims the priority of U.S. application Ser. No. 13/042,775 entitled "Terahertz Radiation Device and Method of Generating Terahertz Radiation," filed Mar. 8, 2011, by Dr. Michael Wraback, et al., and also claims priority of U.S. application Ser. No. 12/435,797 entitled "Method and Apparatus for Enhanced Terahertz Radiation from High Stacking Fault Density," filed May 5, 2009, by Dr. Grace Metcalfe, et al. (U.S. Pat. No. 7,919,764; issue date Apr. 5, 2011) and U.S. Provisional Application No. 61/050,890 filed May 6, 2008. U.S. application Ser. Nos. 13/042,775, 12/435, 797 and 61/050,890 are hereby incorporated herein by reference.

FIELD OF THE INVENTION

This invention relates generally to radiation emitting crystals, and more particularly to crystal structures which provide a source of electromagnetic radiation.

BACKGROUND OF THE INVENTION

Electromagnetic waves sent at terahertz frequencies, known as terahertz (THz) radiation occur in the region of the electromagnetic spectrum between 100 gigahertz ($1\times10^{11}$ Hz) and several terahertz, and correspond to the wavelength range of from roughly a single digit millimeter (high-frequency edge of the microwave band) to roughly 100 micrometer (long-wavelength edge of far-infrared light).

THz-rays, which are shorter than microwaves and longer than infrared, have potential usage in biomedical and security applications in that THz-rays are safe, and non-ionizing, and can pass through (and enable viewing through) such materials as clothing, paper, cardboard, wood, masonry, plastic, ceramics, as well as penetrate fog and clouds. THz radiation is safe for biological tissues (unlike X-rays), and images can be formed with terahertz radiation having resolution of less than 1 mm. THz radiation has potential spectroscopic uses in that while many materials are transparent to THz, many materials exhibit unique spectral identifiers when exposed to terahertz radiation, including explosives, pharmaceuticals, and illegal narcotic substances. Accordingly, items of interest can be observed through normally visually opaque intervening layers, such as packaging and clothing. For example, airport security scanners may use terahertz radiation.

To date, THz rays have not yet been widely used, partly because of the difficulty in producing them at sufficient intensity.

DESCRIPTION OF THE RELATED ART

Previous approaches to terahertz radiation devices have used photoconductive switches in conjunction with a semiconductor comprising two parallel metal strips on the surface separated by a small distance (hundreds of microns to a few millimeters). A schematic illustration of such a configuration is shown in FIG. 1. These metal strips ac (1a, 1b) as electrodes, across which a large voltage (up to kV) is applied, creating electric fields as large as 10 kV/cm. The semiconductor material is highly resistive, such that virtually no current flows without illumination. When the gap between the electrodes is illuminated with an approximately 100 femtosecond pulse of photon energy larger than the fundamental bandgap of the semiconductor, electron-hole pairs are created and swept out in the high field, producing a transient current that generates a THz pulse with usable bandwidth beyond 1 THz. The energy of the THz pulse is proportional to the square of the bias field. One disadvantage of this approach is that metal electrodes with kV voltages across them must be used to create the THz radiation. Another disadvantage is that the external bias voltage, and therefore the THz pulse energy, is limited by dielectric breakdown in air to less than 30 kV/cm in theory, but in practice 10 kV/cm is rarely exceeded.

Terahertz (THz) radiation in conventional devices is commonly generated through in-plane carrier acceleration in electric fields utilizing externally biased photoconductive (PC) switches, a surge-current normal to the surface due to a built-in surface field, or the photo-Dember field. Although the geometry of the biased photoconductive antennas is more favorable for coupling out the THz radiation than that for other semiconductor-based THz sources employing transport normal to the surface, these photoconductive switches require electrode processing and an external bias voltage, which is limited by the dielectric strength of air, to establish an in-plane electric field.

An alternative optical THz generation approach creates narrow band radiation through the mixing of continuous-wave (CW) lasers separated in frequency by the desired terahertz difference frequency in a semiconductor photomixer. Most photomixers use low-temperature grown GaAs thin films as the active layer due to its short carrier lifetime (approximately 0.5 ps), large breakdown-field threshold (>300 kV/cm) and high carrier mobility (~200 cm$^2$/V·s).

THz emission from quantum wells (QWs) (see, for instance, upper half of FIG. 10 in U.S. Pat. No. 7,919,764) has been observed from GaAs/AlGaAs single QWs and multiple quantum wells (MQWs), InGaAs/GaAs and GaSb/AlSb MQWs and superlattices, low indium concentration InGaN/GaN MQWs. For more information, see Turchinovich, "Ultrafast Polarization Dynamics in Biased Quantum Wells Under Strong Femtosecond Optical Excitation;" Physical Review B 68, 241307(R) (2003), Zhang, et al. "Optically Induced Femtosecond Electromagnetic Pulses from GaSb/AlSb Strained Layer Superlattices" Appl. Phys, Lett 57 (8), 20 Aug. 1990, pp. 753-755, and Zhang, et al. "Optoelectronic Measurement of Semiconductor Surfaces and Interfaces with Femtosecond Optics," J. Appl. Phys. 71 (I), 1 Jan. 1992, pages 326-338; all three of which are hereby incorporated by reference. While the THz radiation field is proportional to the number of photoexcited carriers under low excitation conditions, one can readily gauge the importance of the enhanced internal electric field by considering the MQW structure as a nanoscale capacitor, with the energy transfer from the excitation pulse to the THz pulse mediated by the partial or complete discharge of the nanocapacitor. Therefore the maximum THz pulse energy is limited by the electrostatic energy stored in the so-called "nanocapacitor," $U=\frac{1}{2}\,\epsilon\epsilon_0 AdF^2$, where $\epsilon\epsilon_0$ is the static permittivity, A is the area, d is the effective width of the capacitor, and F is the electric field inside the capacitor.

Efficient semiconductor THz sources without external processing or metallization are sought for their ease of system insertion relative to photoconductive switches. These sources rely primarily upon vertical hot electron diffusion and the associated transient photo Dember field due to the difference in electron and hole mobilities that provides a time varying real current ($\delta J/\delta t$). As depicted in FIGS. 2A and 2B, when using prior art "bulk" materials, THz amplitude decreases with increasing bulk carrier concentration due to screening by background carriers. The efficiency of THz generation could be greatly improved in such structures if an internal electric field aiding hot electron diffusion were present.

SUMMARY OF THE INVENTION

A preferred embodiment provides the generation of broadband THz radiation from contactless semiconductor structures using optical excitation, such as a 100 femtosecond pulse source fs pulses.

A preferred embodiment of the present invention improves the efficiency of THz generation through, inter alia, the creation of an internal electric field which aids electron diffusion. The internal electric field may be created through spontaneous and piezoelectric polarization in the vertical (growth) direction. A preferred embodiment comprises transport and divider layers (or regions) in polar compound semiconductors grown along a polar direction; that is, a direction in which the surface is terminated by all cation or anion atoms. The internal electric field is created when the spontaneous and/or piezoelectric polarization is terminated at the interfaces of transport/divider layers (or regions). The interface between the transport and divider layers (or regions) forms boundaries at which the internal electric polarization terminates leading to charges accumulating at the boundaries, and creation of internal electric fields oriented along the polar axis.

The transport layers or regions are formed of a material having a bandgap different from the material forming the divider layers. Because of the difference in band gap, result in the termination of the spontaneous and piezoelectric internal electric polarization along the c-axis of the wurtzite material at the interface between the transport and divider layers (or regions). For example, the divider layers or regions may be made of indium gallium nitride and the transport layers may be made of gallium nitride; both of which materials may be grown by vapor deposition or epitaxy (forming heterojunctions) on a polar or semipolar substrate. The plane of the layers may be perpendicular to the polar axis, although being not parallel to the polar axis is sufficient. When the preferred embodiment is irradiated by a pulsed source of duration less than one picosecond, a time-varying and spatially nonuniform distribution of carriers is created in the growth direction of the polar crystal material within the transport and divider layers (or regions), thereby generating a first time-varying current due to diffusion of the carriers. The internal electric fields accelerate the carriers generated by the pulsed radiation source to produce a second time-varying current that is in addition to the first time-varying current, thereby enhancing the generation of terahertz radiation. The first time-varying current due to diffusion and the second time-varying current that is produced by the internal electric field are in the same direction (parallel to the polar axis) and are additive. When the divider layers (or regions) are formed of a material that has a smaller band gap than the bandgap of the material forming the transport layers, the divider layers operate to collect background carriers thereby enhancing the first time-varying current due to diffusion and the second time-varying current produced by the internal electric field such that terahertz radiation is enhanced. Also, as an additional benefit of the divider layers (or regions), the time-varying Dember field produced by the first time-varying current is not screened by the presence of back ground carriers (from doping, etc.).

The transport and divider layers (or regions) may be formed of wurtzite semiconductor material that is GaN, InN, AlN, or alloys thereof, or ZnO, MgO, ZnS, ZnSe, ZnTe, or alloys thereof. When the divider layers (or regions) are formed of a material that has a smaller band gap than the bandgap of the material forming the transport layers (or regions), the growth of the crystal is terminated on face containing Group II or Group III atoms. When the divider layers (or regions) are formed of a material that has a larger band gap than the bandgap of the material forming the transport layers, the growth of the crystal is terminated on face containing Group V or Group VI atoms.

The orientation of the plurality of layers (or regions) of polar crystal material layer may be polar or semipolar. Pulsed sources that may be used with the preferred embodiments include a pulsed light, electron, or ionizing particle source.

The thickness of each divider layer (or region) is in the range of one monolayer to several nanometers and each of the transport layers (or regions) is at least several nanometers and larger than the thickness of a divider layer (or region).

A preferred method of generating terahertz radiation comprises: growing transport and divider layers (or regions) using a wurtzite polar crystal material such that the c-axis is perpendicular or has a projection perpendicular to the growth plane; the material forming the divider layers (or regions) having a different bandgap than the material forming the transport layers (or regions), the interface between the transport and divider layers (or regions) forming boundaries at which the internal electric polarization terminates leading to charges accumulating at the boundaries, and creation of internal electric fields oriented along the polar axis; and irradiating the surface of the polar crystal material with a pulsed radiation source. The pulsed radiation source operates to create carriers in the polar crystal material thereby generating a first time-varying current due to diffusion; the internal electric field accelerating the carriers to produce a second time-varying current that is additive with the first time-varying current thereby creating terahertz radiation propagated in the plane of incidence. The step of irradiating the surface comprises propagating the pulsed radiation source of pulse duration less than one picosecond in a direction which is not normal to the surface of the device. The internal electric polarization in the growth direction of the polar crystal material of the transport layers (or regions) is terminated by the divider layers, creating interfaces and charge accumulation at the interfaces leading to the occurrence of electric fields parallel to growth direction of the crystal, such that transport of carriers excited by pulsed radiation source proceeds parallel to the electric field, leading to a terahertz radiation. A preferred embodiment may comprise transport and divider layers (or regions) which form heterojunctions within a heterostructure having a thickness of at least one absorption length of the exciting radiation. The heterostructure layers may be grown by vapor deposition or epitaxy on a polar or semipolar substrate.

As described further herein, a preferred embodiment comprises a heterostructure formed of polar crystal material operative to emit terahertz radiation; the heterostructure comprising transport and divider layers (or regions), the transport regions having a different bandgap than that of the divider layers (or regions), the interface between the transport regions and divider layers (or regions) forming boundaries at which the internal electric polarization terminates leading to charges accumulating at the boundaries, and creation of internal electric fields in the transport regions oriented along the polar axis; whereby when irradiated by a pulsed femtosecond light source, a time-varying and spatially nonuniform distribution of photo-carriers is created in the growth direction of the heterostructure thereby generating a first time-varying photo-current due to diffusion of the photo-carriers; the internal electric field accelerating the photo-carriers generated by the pulsed radiation source to produce a second time-varying photo-current that is additive with the first time-varying photo-current thereby enhancing generation of terahertz radiation.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 4A schematically illustrates a comparison of the relative orientations of the crystal structure for polar and nonpolar materials; and in particular, the orientation of the c-axis relative to the growth plane and growth direction. Non-polar orientation occurs when the c-axis is parallel to the growth plane.

FIG. 4B illustrates the orientation of the crystal structure for a semi-polar material relative to the growth plane. For the semi-polar structure utilized in conjunction with the present invention, the vector projection of the c-axis onto the growth plane is of a non-zero magnitude.

FIG. 6 is a depiction of the crystal lattice structure for GaN showing the c-plane, c-axis, a-plane and m-plane, as further exemplified in the hexagonal lattice structure depicted on the right.

FIG. 10 is a graphical illustration depicting time resolved terahertz signal intensity for the embodiment of FIG. 9.

DETAILED DESCRIPTION OF THE PREFERRED EMBODIMENTS

Figure 1:
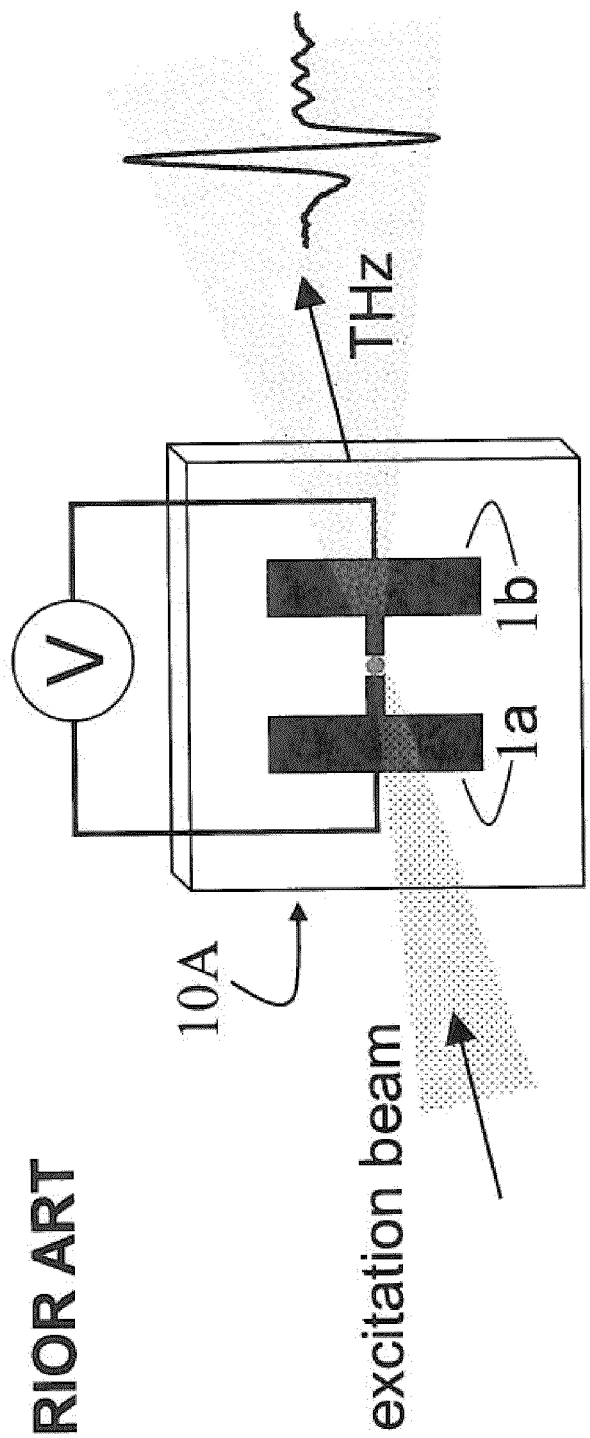
FIG. 1 is a schematic illustration of a prior art photoconductive switch device for producing terahertz radiation.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Moreover, as used herein the terminology "first" when used in connection with currents does not mean first in time.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions or layers illustrated herein but are to include deviations in shapes that result, for example, from manufacturing. For example, an etched region illustrated as a rectangle will, typically, have tapered, rounded or curved features. Thus, the regions or layers illustrated in the figures are schematic in nature and their shapes are not intended to illustrate the precise shape of a region or layer of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

The present invention provides, inter alia, a new source of terahertz radiation that will provide significantly more terahertz power when excited by a femtosecond laser pulse than that which can be obtained using state-of-the-art photoconductive switches. This is accomplished by engineering higher internal electric fields into the device. As shown for example in FIG. 1, previous approaches used large, externally applied voltages in conjunction with large aperture photoconductive switches, comprised of a semiconductor with two parallel metal strips on the surface separated by a small distance (hundreds of microns to a few millimeters) that act as electrodes, across which a large voltage (up to a kV) is applied, creating electric fields as large as 10 kV/cm; subject to dielectric breakdown in air. When the gap between the electrodes is illuminated with a ~100 femtosecond pulse of photon energy larger than the fundamental bandgap of the semiconductor, electron-hole pairs are created and are swept out in the high field, producing a transient current that generates a THz pulse with useable bandwidth beyond 1 THz. The energy of the THz pulse is proportional to the square of the bias field. The semiconductor material is highly resistive, such that virtually no current flows without illumination. Because the present invention does not require metal contacts, fabrication costs are reduced.

Figure 3:
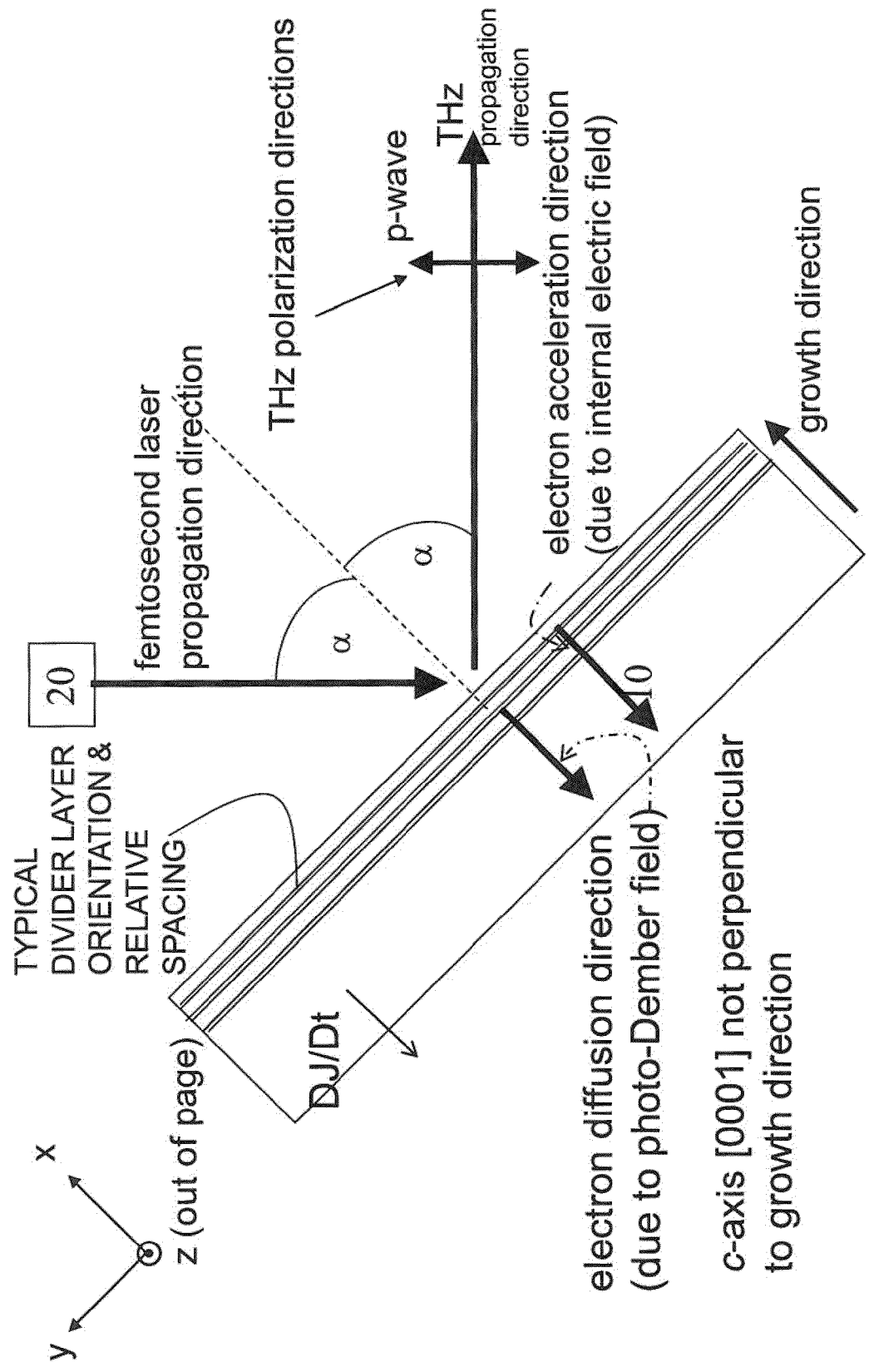
FIG. 3 schematically illustrates a preferred embodiment orientation of a femtosecond pulsed laser source relative to a semiconductor crystal 10, and the terahertz beam produced by the femtosecond laser source. The two layers depicted in FIG. 3 are representative of multiple layers; for the sake of simplicity only two divider layers are shown whereas the actual embodiment would have multiple layers; such as, for example, 10.

The present invention relates to Terahertz (THz) emission by a polar crystal upon excitation by a femtosecond laser source as shown schematically in FIG. 3. As recognized by those of ordinary skill in the art, a femtosecond is $10^{-15}$ seconds and a femtosecond laser is a laser that operates in the domain of femtoseconds. The most preferable excitation source, labeled 20 in FIG. 3, is a low cost, compact, femtosecond fiber laser operating at either 1030 nm or 1560 nm (fundamental), or 515 nm or 780 nm (second harmonic). Preferably the pulsed radiation source has a photon energy greater than the bandgap of the crystal material. During photo excitation, a photo-Dember field can occur at the surface of a semiconductor due to a difference in diffusion coefficients for electrons and holes, and a structural asymmetry. Typically, electrons have a larger diffusion coefficient than holes. Consequently, upon photoexcitation, electrons diffuse more rapidly than the holes. In the absence of a structural asymmetry, no net dipole field is observed, since the center of charge does not change.

The present invention relates to Terahertz (THz) emission by a semiconductor preferred embodiment 10 upon excitation by a femtosecond laser source 20, as shown schematically in FIG. 3. FIG. 3 illustrates, inter alia, the directions of the p-polarized components of the terahertz waveform produced by laser excitation of the preferred embodiment semiconductor crystal structure 10. During photo excitation, a photo-Dember field can occur at the surface of a semiconductor due to a difference in diffusion coefficients for electrons and holes, and a structural asymmetry. Typically, electrons have a larger diffusion coefficient than holes. Consequently, upon photoexcitation, electrons diffuse more rapidly than the holes. In the absence of a structural asymmetry, no net dipole field is observed, since the center of charge does not change.

In order to derive the THz electric field radiated, the first derivative of the net current with respect to time or the second derivative of the polarization, is calculated as a function of time. It acts as the source term in Maxwell's equations when determining the THz emission.

By way of background, the terminology "polar" semiconductor is repeatedly referenced. A substance which has an unequal sharing of charge among constituent elements in the absence of a field is called a polar material. As used herein, the terminology polar, nonpolar, and semipolar relate to the orientations of the polar material. Specifically, FIGS. 4A and 4B are illustrations showing three different orientations (polar, nonpolar and semipolar) of the c-axis of a wurtzite crystal's structure (with c-axis being defined as perpendicular to the c-plane) relative to the growth plane, which in these examples is the sample surface. In the polar orientation example shown in FIG. 4A, the c-axis is perpendicular to the growth plane. In the nonpolar orientation example, the c-axis is parallel to the growth plane and perpendicular to the growth direction. A semipolar orientation is depicted in FIG. 4B in which the c-axis of the crystal structure has a projection onto the growth plane. As used herein the terminology "projection onto" refers to a mathematical construct in which a vector diagram can be used to evaluate the intensity of the component projected onto a given plane. As shown in FIG. 4B, the projection of the c-axis onto the growth plane results in a vector component labeled as "projection of c-axis onto growth plane" in FIG. 4B. As seen in FIG. 4B, the intensity value associated with the projection is non-zero; but may be in the range of from whatever angle that the crystal may be cut to 100%. The orientation of the crystal structure is that represented by the insert in FIG. 4B.

Figure 7:
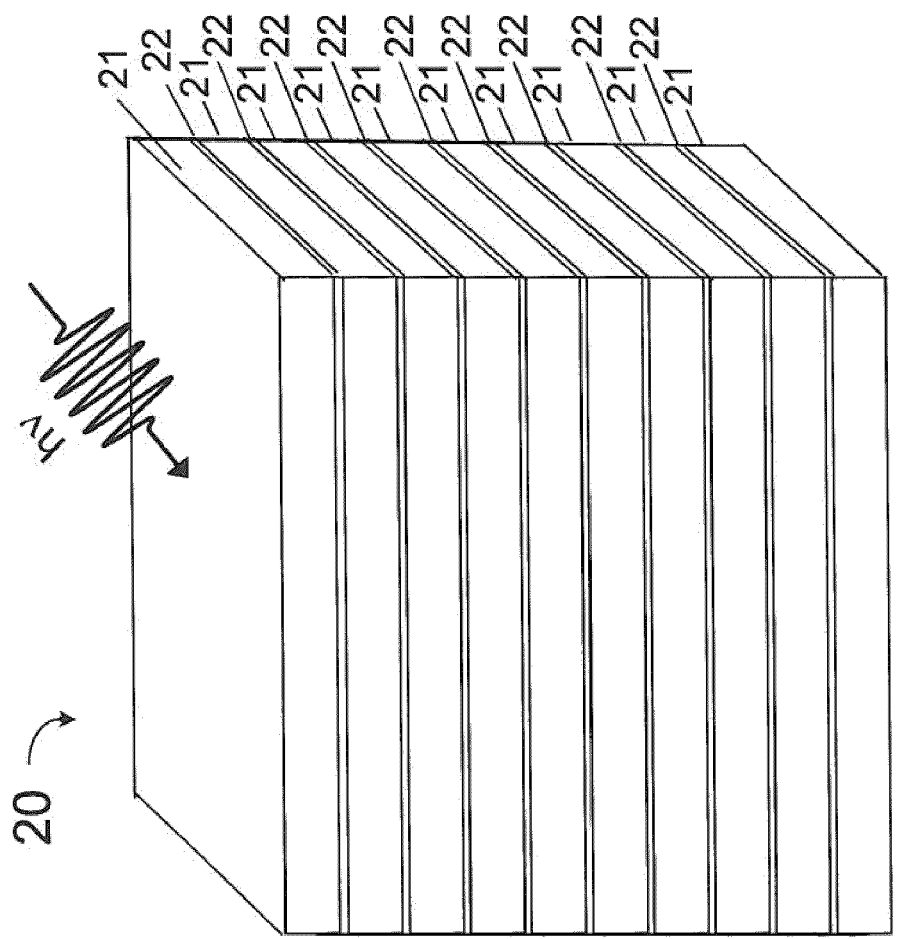
FIG. 7 is a schematic illustration showing a preferred embodiment 20 having transport layers 21 and divider layers 22.

A preferred embodiment of the present invention improves the efficiency of THz generation through the creation of an internal electric field which aids electron (carrier) diffusion. The internal electric field is created in the vertical (growth) direction by using transport regions (or layers) and divider regions (or layers) in polar compound semiconductors grown along a polar direction; that is, a direction in which the surface is terminated by all cation or anion atoms. In these materials, an internal electric field is created when the spontaneous and/or piezoelectric polarization is terminated at the interfaces of transport/restrictor regions. As shown in FIG. 7, the transport regions 21 are generally much larger than the divider regions 22. The divider regions function to create an interface such that the polarization charge which builds in the transport region is effectively stopped at the interface resulting in an electric field. The polarization charge within multiple transport regions 21 which are terminated by dividers 22 result in multiple, additive electrical fields being created. Although the terminology "divider" is used to describe regions or layers 22, it can be readily appreciated by those skilled in the art that any means which operates to terminate the polarization charge at the boundary of the transport region or layer could be used without departing from the scope of the present invention.

Figure 8:
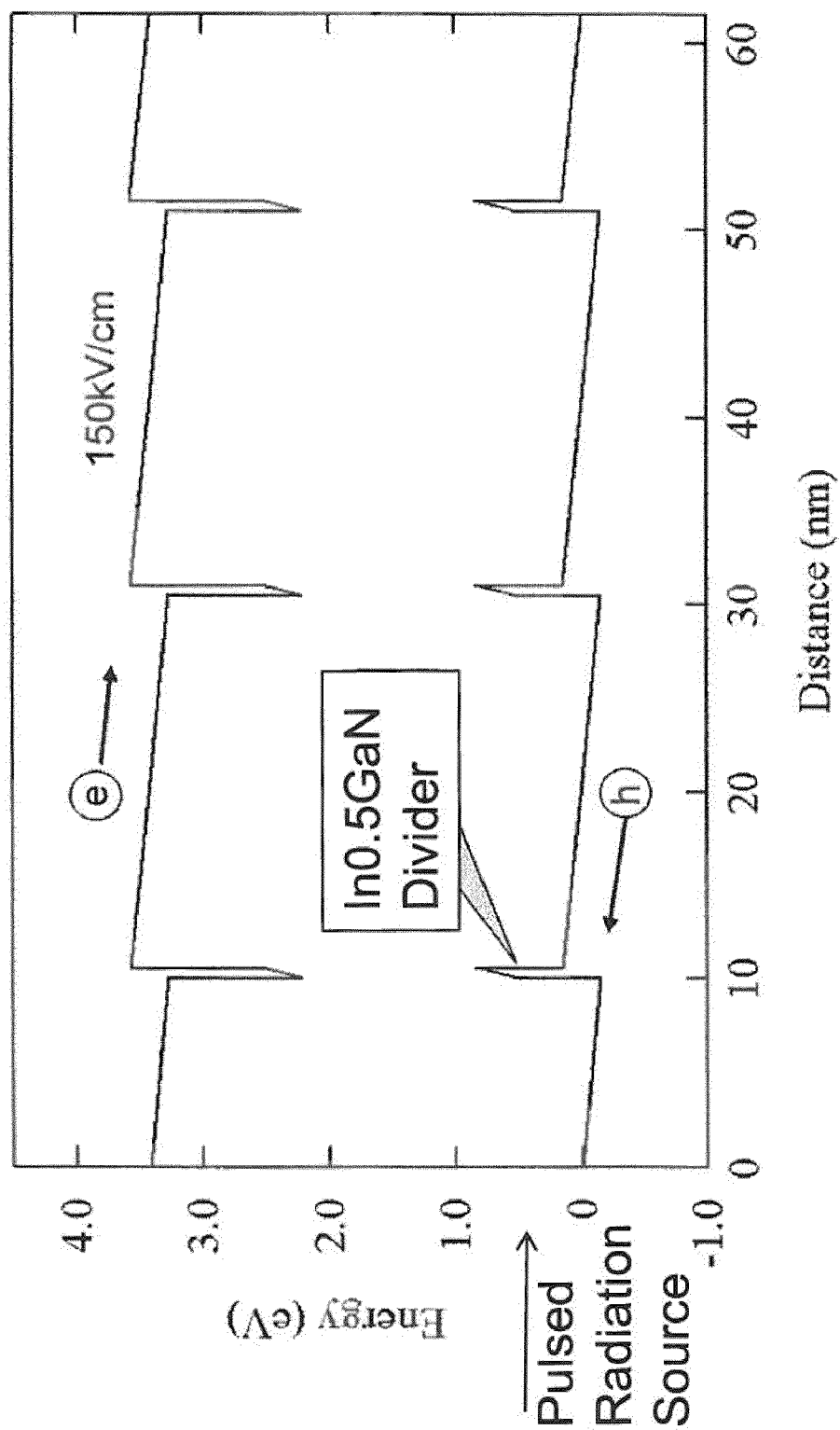
FIG. 8 is an energy band diagram of a preferred embodiment with $In_{0.5}GaN$ divider regions or layers and GaN transport regions or layers.

FIG. 8 is an energy band diagram of a preferred embodiment with In0.5GaN divider regions or layers. The transport regions are in effect terminated by divider regions, the effect of which is depicted at distances of roughly 10, 30 and 50, at which locations the change in bandgap is depicted. In FIG. 8, the electrons are depicted using a circled "e" and the holes are depicted using a circled "h."

Turning now to a different subject, in zincblende semiconductors such as III-V arsenides, antimonides, or phosphides, the spontaneous polarization is very small, and there is only a piezoelectric field associated with the strain in the structure resulting from the lattice mismatch between the divider and transport materials. The divider regions are regions of smaller bandgap; whereas the transport regions have a larger bandgap. In preferred embodiments using zinc blende materials, advantage is taken of transport of carriers in the larger bandgap aterial.

Since a large field is desirable, and since zinc blende is not as polar as Wurtzite, in order to obtain a large electric field, it is desirable to make the divider regions narrow to get large field, similar to the formation of a quantum well. Normally, in the case of quantum wells, the quantum wells contain excited carriers which are localized in the well. Barrier regions around the well have a larger band gap than the material forming the quantum well. Consequently, the field exists in wells rather than barriers in an effort to maximize the field in the quantum wells. The quantum wells are normally thinner than the barriers and larger electric field exists in the wells, up to a few hundred kV/cm; with a much smaller (according to the ratio of the well and barrier thicknesses) and opposite field existing in the barrier regions. Because the field in the barriers is much smaller than that in the wells, one optically excites only the wells using the fs pulses to achieve THz generation. However, the photoexcited carriers are confined to the wells and no benefit of hot electron diffusion is attained for THz generation; the THz is generated by photocarrier screening of the in-well dipole moment and is proportional to the second time derivative of the displacement ($\delta^2 D/\delta t^2$). In zincblende materials, the enhancement of the THz generation from the barriers is limited by a piezoelectric polarization not being large enough; compounded by strain relaxation beyond the critical thickness, and the wide barriers or wells required for significant hot electron transport do not possess sufficient electric field. In other words, optimal performance cannot be obtained when relying only on strain (since the piezoelectric polarization is not large enough) and reliance on quantum wells is undesirable since one cannot obtain sufficient transport in wells since carriers are localized.

A better choice than zinc blende in this regard is wurtzite semiconductors such as III-V nitrides which possess a large spontaneous polarization in addition to the piezoelectric polarization for growth along a polar axis. The combination of these two polarizations can lead to internal electric fields an order of magnitude larger than those attained in polar zincblende structures when terminated at well/barrier interfaces. Using wurtzite, sufficient field strength is found in what was previously regarded as the barrier regions, by combining drift and diffusion. Instead of exciting carriers in quantum wells, where there is neither drift nor diffusion occurring (as there is simply a localized dipole), in accordance with the principles of the present invention, diffusive transport is obtained using as large concentration gradient as possible. The concentration gradient is developed by exciting material using absorption of light.

Figure 9:
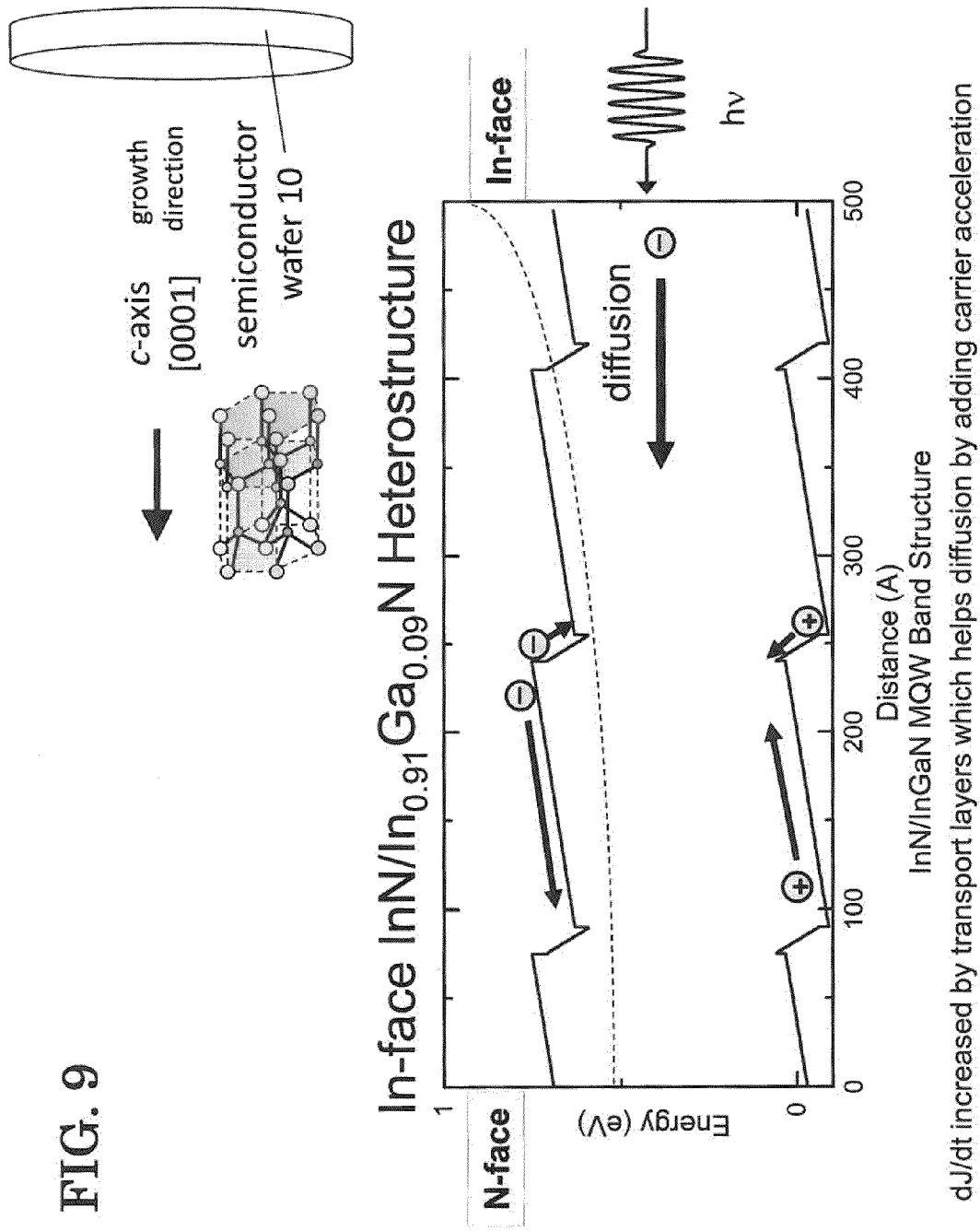
FIG. 9 is an energy band diagram of a preferred embodiment $InN/In_{0.91}Ga_{0.09}N$ Heterostructure. The dash line approximates the absorption profile of the incident light in the material.

FIG. 9 is a depiction of the band energy diagram of a preferred embodiment incorporating a wurtzite structure and the discontinuities in the wurtzite structure caused by divider structural formations. As depicted by the circular representations (○) of electrons (−) and holes (+) in FIG. 9, internal electric fields are created due to the termination of the internal polarization at the interfaces between materials, such as between InGaN and InN. Note that a divider layer or region is depicted at the midpoint (a distance of roughly 250) in FIG. 9. In the FIG. 9 example, two other divider regions or layers are depicted, one occurring roughly between 400 and 420 and the other roughly between 75 and 90.

FIG. 10 is a graphical illustration depicting time resolved terahertz signal intensity for the embodiment depicted in FIG. 9 relative to a bulk material sample not incorporating the divider and transport layers of the present invention. For the experiment represented in FIG. 10, the amplitude of terahertz emission is larger than that emitted from the bulk material sample.

Figure 2A:
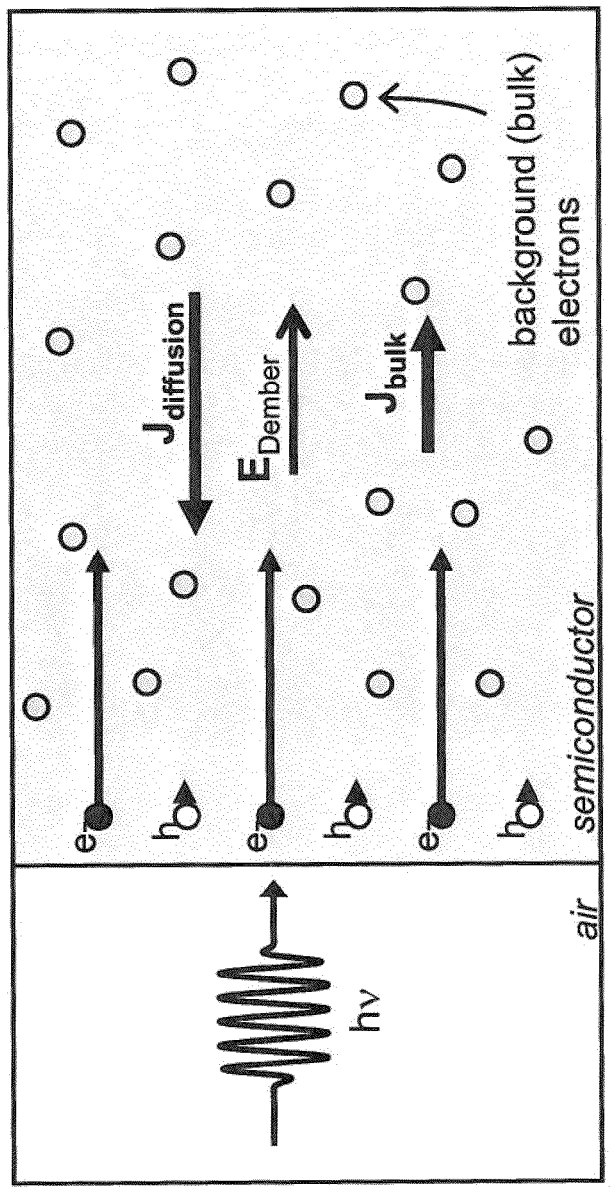
FIG. 2A is a schematic illustration of the photo-Dember effect and further illustrates the screening of carriers due to background or bulk carriers. For example, background carriers due to doping of the semiconductor.
Figure 2B:
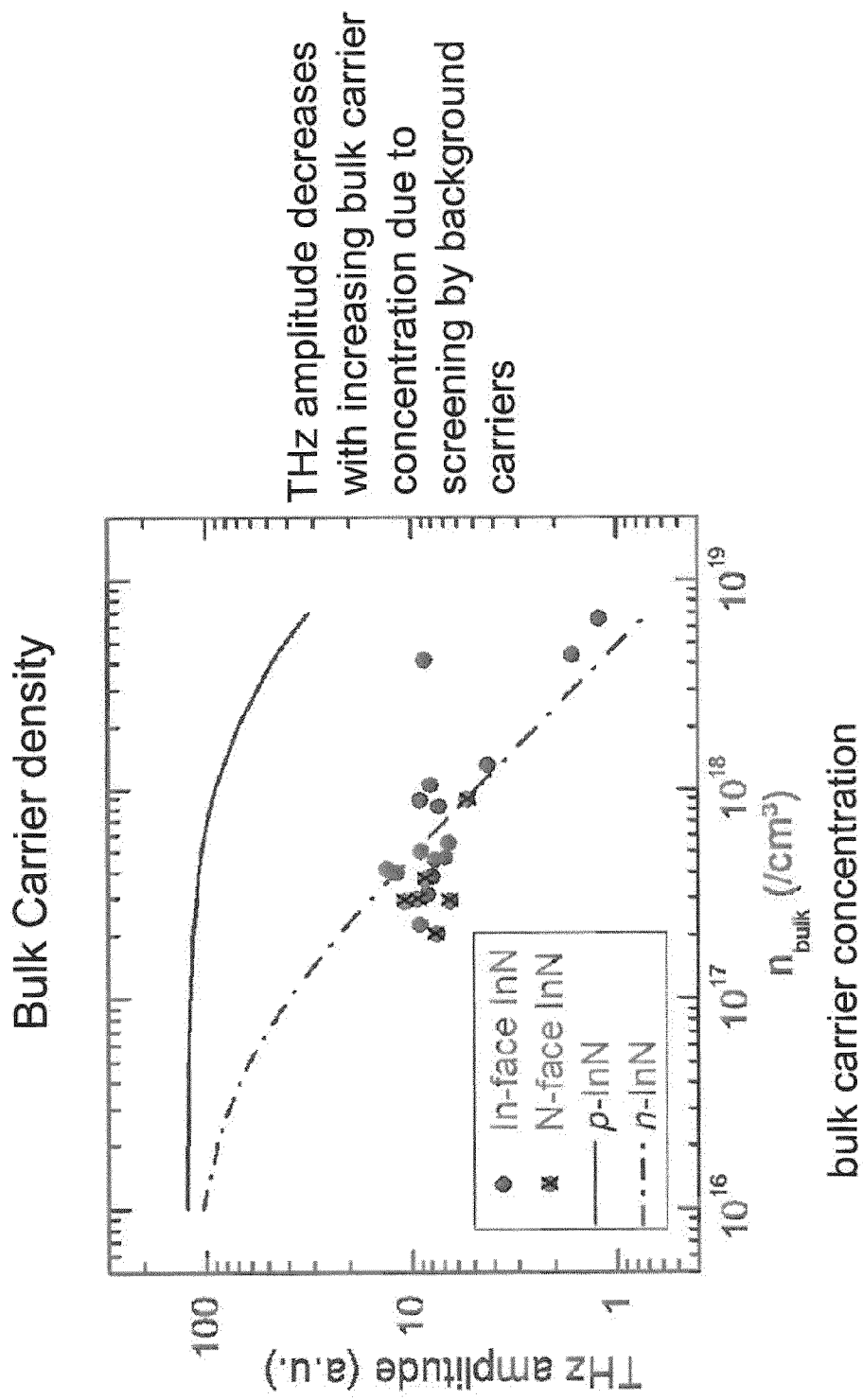
FIG. 2B is a graphical illustration showing THz amplitude decreases with increasing bulk carrier concentration due to screening by background carriers.

As depicted for example in by the dotted line in FIG. 9, the structure oriented concentration gradient creates diffusion and the electric field leads to acceleration of the electrons; as the carriers move faster than by diffusion alone. While others have used nitride semiconductor multiple quantum wells to generate THz radiation using in-well optical pumping to take advantage of the displacement current effect described above, that approach did not achieve the additional benefit of hot electron diffusion, since the carriers are localized in very small (~2 nm) quantum wells. Using the present invention, advantage is taken of the large electric fields formed in what was previously thought of as barrier regions (herein referred to as transport regions) of nitride semiconductor multiple quantum wells to enhance THz generation through carrier acceleration as the electric field that aids the hot electron diffusive transport. In such a case, because of the very large electric fields in the nitride semiconductor heterostructures, the transport regions, formed of a larger band gap material, can be made an order of magnitude wider than the divider regions of a smaller band gap material (previously referred to as quantum wells) and still achieve electric fields in excess of 100 kV/cm. Electron drift or acceleration in these fields operates to greatly enhance hot electron diffusive transport, creating a larger $\delta J/\delta t$ and therefore enhanced THz emission. The divider regions (formerly referred to as "quantum wells") operate as "stressors," i.e., very small "wells" (1-2 nm) with very large transport/barriers (10-20 nm) wells. These divider regions (shown as 22 in FIG. 7) serve the additional purpose of localizing background carriers in non-intrinsic materials that would otherwise screen the Dember field associated with hot electron diffusion and reduce the THz emission efficiency. Basing terahertz radiation upon diffusion (i.e., relying on fact that electrons and holes have different diffusivities and electrons travel further than holes in the Dember field), leads to the consequence of background carriers screening the Dember Field, illustrated in FIGS. 2A and 2B. However, the divider regions or layers operate to contain the background carriers, such that such carriers are not present to screen the Dember Field. In the prior art, it was common to use a bulk material with very low background concentration of carriers for this reason.

Referring now to FIG. 7, the predominant transport regions 21 separated by divider regions 22. Referring now to FIG. 8, shown is a band diagram for a GaN structure with 0.5 nm In0.5GaN layers as the dividers and a period of 20.5 nm. The electric field in the barrier region is as high as 150 kV/cm. The drift of electrons and holes is indicated by the arrows.

The electric field is developed in the transport regions 21 while the interstitial regions 22 operate to create a polarization discontinuity at the interfaces with the transport regions 21. Preferably the regions 21 are of substantially equal size such that the interstitial regions 22 are periodically spaced therebetween. For example, for every ten nanometers, one nanometer of the material may contain a divider region 22. The electric field is maintained at a substantially constant level by periodically inserting divider regions 22 that create polarization discontinuity. This concept is analogous to the use of stacking faults (described in greater detail in U.S. Pat. No. 7,919,764 ('764 Patent) except stacking faults not evenly spaced. By keeping the regions 21 substantially constant, the electric field can be kept substantially the same within the transport regions or layers 21. Consequently, the preferred embodiment of FIG. 7 is more predictable than the stacking fault embodiment in the '764 Patent, wherein zinc blende, which has a lower band gap than wurtzite, was utilized. Similar in some respects to the embodiments disclosed in the '764 Patent, regions 22 are used as dividers just as the stacking faults are used as dividers between two wurtzite regions. In case of FIG. 7, both the dividers and transport regions may be wurtzite. The divider region 22 may be, for example, a different wurtzite material such as Indium nitride (smaller bandgap) and the transport region 21 may be Indium Gallium Nitride (larger bandgap). Regarding the difference in bandgap, it is desirable to have spontaneous polarization, but choose difference to be such that the width of the transport region does not lead to strain relaxation. Although it is not necessary to have the material completely strained; it may be helpful.

As an example, in conjunction with the preferred embodiment of FIG. 7, one may use compounds with a large difference in spontaneous polarization, such as aluminum nitride and gallium nitride. As another example, indium gallium nitride and gallium nitride may be utilized such that the piezoelectric polarization dominates. Care should be taken to avoid exceeding the critical thickness so as to prevent failure and relaxation of the strain. As shown for example in FIG. 8, the difference in indium content is between the indium gallium nitride and gallium nitride need only be 0.5.

In order to derive the THz electric field radiated, the time derivative of the net current, $$\frac{\partial J}{\partial t} = \sum q_i r_i$$

is calculated as a function of time. It acts as the source term in Maxwell's equations when determining the THz emission Using the appropriate boundary conditions at the interface and Maxwell's equations, the electric field $F_T$ in the transport layer can then be expressed as $$F_T = \frac{P}{\varepsilon_0}\left(\frac{1}{\varepsilon_T + \varepsilon_D[d_T/d_D]}\right), \quad (2)$$

(where P is total polarization, including spontaneous and piezoelectric polarization, $\varepsilon_T$ and $\varepsilon_D$ are the dielectric constants of the transport or snf divider regions, respectively, $d_T$ and $d_D$ represent the thickness of the transport or snf divider regions, respectively, and $\varepsilon_o$ permittivity of free space), the contribution to the electric field of the THz radiation, $E_{THz}$, due to the drift of carriers-related internal electric field, is proportional to the time derivative of the transient photocurrent J(t), which is proportional to the internal electric field in the transport region, $F_{wT}$. For example, a structure with 10 nm AlN as the transport layer and 1 nm GaN as the divider layer, the electric field calculated using P=0.1 C/m² with equation 2, the electric field in the transport region is about 1 MV/cm, using equation 2.

A substance which has a natural charge separation in the absence of a field is called a polar material. As used herein, the terminology polar, nonpolar, and semipolar relate to the orientations of the polar material. Specifically, FIGS. 4A and 4B are illustrations showing three different orientations (polar, nonpolar and semipolar) of the c-axis of a crystal's structure with c-axis being defined as perpendicular to the c-plane) relative to the growth plane, which in these examples is the sample surface. In the polar orientation example shown in FIG. 4A, the c-axis is perpendicular to the growth plane. In the nonpolar orientation example, the c-axis is parallel to the growth plane and perpendicular to the growth direction. A semipolar orientation is depicted in FIG. 4B in which the c-axis of the crystal structure has a projection onto the growth plane. As used herein the terminology "projection onto" refers to a mathematical construct in which a vector diagram can be used to evaluate the intensity of the component projected onto a given plane. As shown in FIG. 4B, the projection of the c-axis onto the growth plane results in a vector component labeled as "projection of c-axis onto growth plane" in FIG. 4B. As seen in FIG. 4B, the intensity value associated with the projection is non-zero; but may be in the range of 30 to 100%. The orientation of the crystal structure is that represented by the insert in FIG. 4B.

In addition to non-polar oriented crystal structure configurations where there is a non-zero in-plane electric polarization, the principles of the invention may be utilized with structures in which there is a projection of the c-axis on the growth plane, which is referred to as semi-polar oriented material; a representation of which is shown in FIG. 4B.

The present invention enables the generation of broadband THz pulses with higher pulse energy than a conventional photoconductive switch embodiment because it can support higher electric fields. Tests were performed using a coherent regenerative amplifier (RegA) at 800 nm. The typical pulse width is approximately 150 fs with a pump power of approximately 3 mW. FIG. 3 is a schematic illustration showing the orientation of a sample relative to the femtosecond laser excitation. As shown in FIG. 3, the pump beam (20) is incident on the a-sample 10, for example GaN, at approximately 45 degrees to the surface normal.

Analysis of the polarization of the terahertz radiation may be conducted when the crystal material is irradiated using a pulsed radiation source with an energy in the approximate range of 1 to 25 nano-joules, a wavelength of 200-1800 nanometer, and a pulse duration in the approximate range of 10 to 300 femtoseconds, a pump beam spot size in the approximate range 0.5 to 2 millimeters, and an angle of incidence in the approximate range of 30 to 60 degrees, and when the subsequent terahertz emission is collected with a pair of parabolic mirrors onto an electro-optic crystal such as ZnTe for electro-optic sampling and wherein the ZnTe-based terahertz electro-optic detection system is polarization sensitive.

Figure 5A:
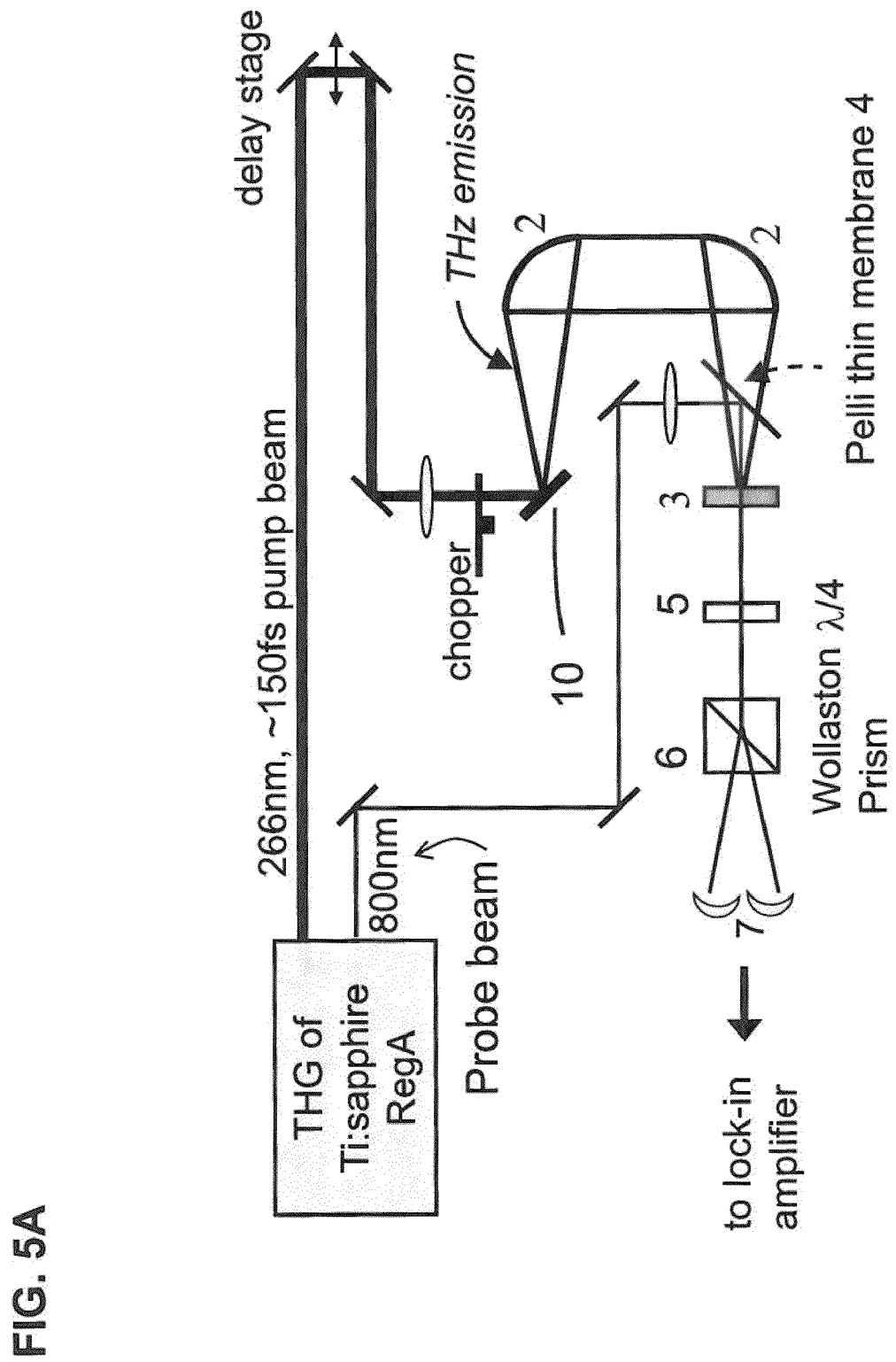
FIG. 5A is a schematic illustration of a preferred embodiment for producing and measuring terahertz emission from a crystal material 10.

FIG. 5A is a schematic illustration showing a GaN sample 10 in which the subsequent THz emission is collected with a pair of parabolic mirrors (2) on to a sensor 3 (which may for example an electro-optic crystal such as a ZnTe crystal) for electro-optic sampling, using part of the 800 nm beam as the probe. The terahertz detection may also be done using a photoconductive switch. In the configurations shown in FIG. 5A-D, the polarization of the pump and probe beams are both in the plane of incidence. The plane of incidence is best understood by reference to FIG. 3 as the plane containing the laser propagated (incident) and THz propagated directional arrows. The configuration shown in FIG. 5A enables measurements via ultrafast optical excitation. A regenerative amplifier (RegA) system, which operates at 800 nm and has a repetition rate of 250 kHz, may be used as the ultrafast laser source 20. The output of the RegA is split into two beams. For infrared excitation pulses, the stronger beam is frequency doubled to serve as the pump source for an optical parametric amplifier (OPA), which generates an infrared idler pulse tunable from ~0.9-2.4 micrometers. The OPA also produces a visible signal beam tunable from ~480-720 nm. The signal beam at 700 nm is doubled for 350 nm excitation. For other ultraviolet pulses, the stronger RegA beam is frequency doubled (400 nm) or tripled (266 nm). The pump pulse, after compression with a prism pair to typical pulse widths of ~150 fs, is focused onto the semiconductor sample 10 at a 45° incidence angle with a beam diameter of ~1 mm. The pump power is ~4 mW for all excitation wavelengths. The weaker RegA split-off beam is used to probe the THz emission for all excitation wavelengths, as well as to irradiate the samples at 800 nm. The subsequent THz emission from the semiconductor surface is collected and focused with a pair of off-axis parabolic mirrors (2) onto a 2 mm-thick ZnTe crystal (3) for electro-optic (EO) sampling, which is based on the linear EO effect or Pockels effect and allows for coherent detection of freely propagating THz emission. The THz radiation incident on the EO crystal alters the birefringence of the crystal which results in a phase retardation of the probe beam through the EO crystal. Monitoring of the phase retardation of the probe beam is conducted with a balanced detector system.

The detection is a known electro optic sampling technique for detecting Terahertz emission. The configurations shown in FIGS. 5A, 5B and 5C use both a probe beam and a pump beam. Specifically, a reflector 4, which may be for example, a pellicle or thin membrane, reflects the probe beam and transmits terahertz radiation. The quarter wave plate 5 results in the linearly polarized incident probe beam becoming circularly polarized. The circularly polarized probe beam is then split by the Wollaston prism 6 which breaks up the vertically and horizontally polarized components of the probe beam spatially. The difference signal between the vertically and horizontally polarized components is detected using a balanced detector. When no terahertz emission is present, the balanced detector measures no signal. When terahertz emission is produced, the circularly polarized probe beam becomes elliptically polarized. For an elliptically polarized probe beam, one polarization component has a stronger amplitude and the balanced detector 7, indicates the difference between each; i.e., the detectors effectively breaks the beam into two orthogonal polarizations, and because the elliptically polarized probe light has two unequal components due to the Terahertz emission, the subtraction results in measurement of the Terahertz emission. For a more comprehensive explanation, reference is made to A. Nahata, et al., "Coherent Detection of Freely Propagating Terahertz Radiation by Electro-optic Sampling," Appl. Phys. Lett. 68 (2), 8 Jan. 1996, which is hereby incorporated by reference. Although all III-Nitride semiconductors can emit THz radiation, a preferred embodiment utilizes InN, which has applications in 1550 nm fiber-laser based systems.

Figure 5B:
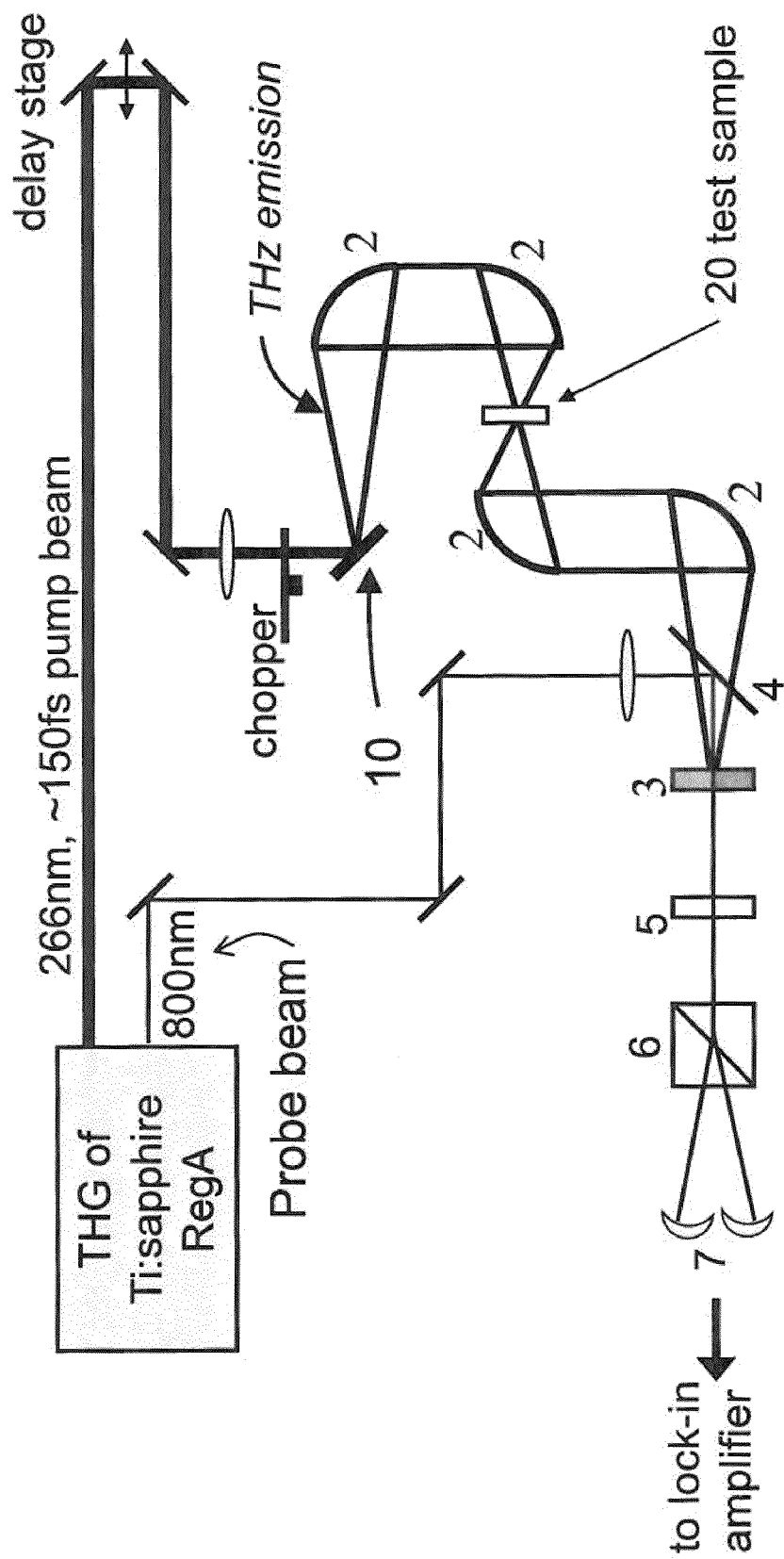
FIG. 5B is a schematic illustration of a preferred embodiment for producing and measuring terahertz emission from a crystal material 10 wherein detection is accomplished from measuring terahertz transmission transmitted through the test sample.
Figure 5C:
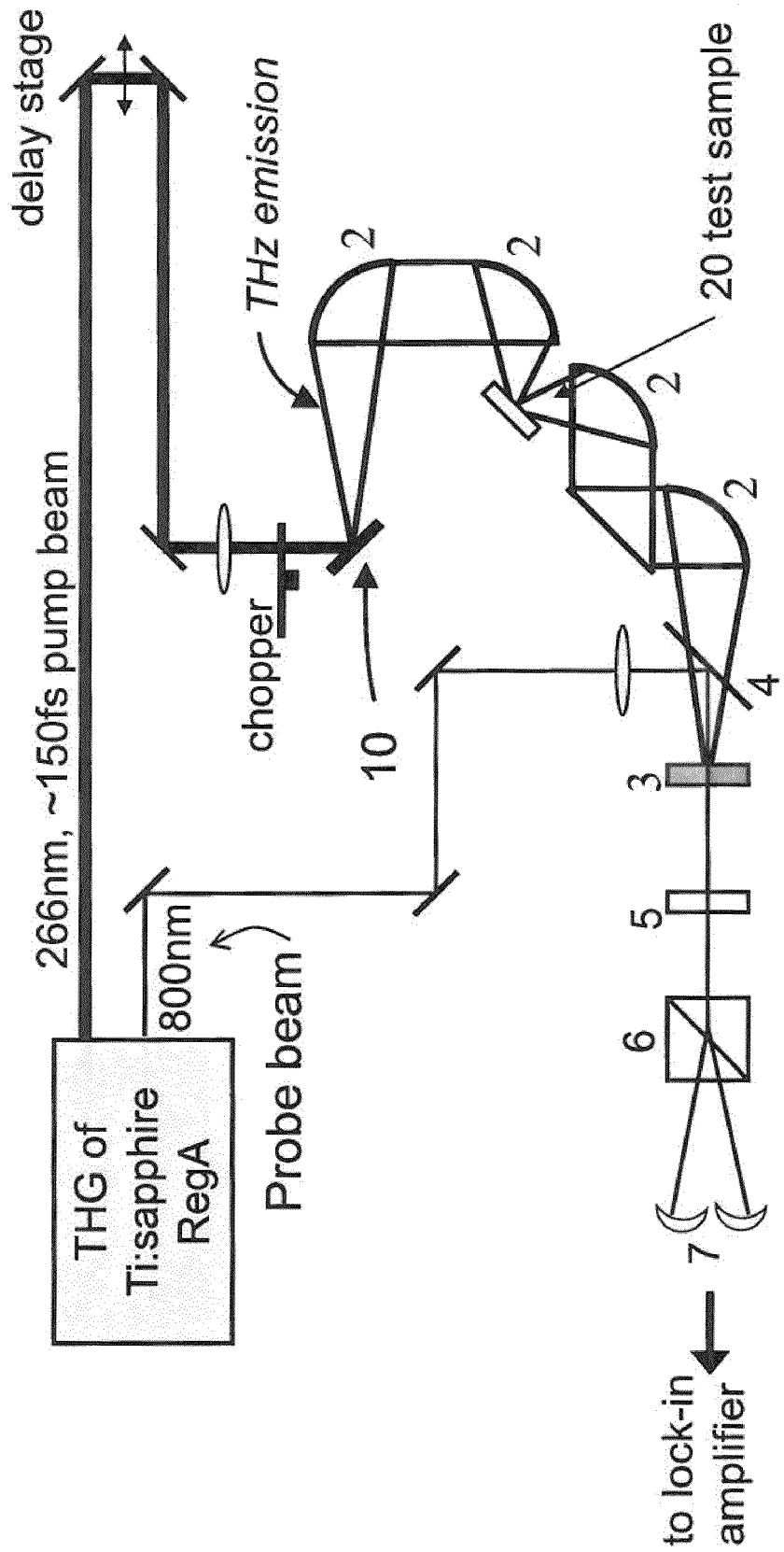
FIG. 5C is a schematic illustration of a preferred embodiment for producing and measuring terahertz emission from a crystal material 10 reflected from a test sample.

FIG. 5B is a configuration in which a test sample 20 is subjected to Terahertz radiation and the configuration measure transmission of THz through a test sample. The test sample 20 can be in a gas, liquid or solid phase. In FIGS. 5B and 5C, elements corresponding to those in FIG. 5A are numbered with corresponding numbers. THz emission is collected with four parabolic mirrors 2 onto an electro-optic crystal 3 (which may for example be a ZnTe crystal) for electro-optic sampling, using part of the 800 nm beam as the probe. The pellicle or thin membrane 4 reflects the probe beam while allowing the terahertz radiation to pass through. The polarization of the pump and probe beams are both in the plane of incidence. The plane of incidence is best understood by reference to FIG. 3 as the plane containing the laser propagated (incident) and THz propagated directional arrows. The quarter wave plate 5 is an optical device that alters the polarization state of a light wave travelling through it by shifting the phase between two perpendicular polarization components of the light wave. The quarter-wave plate 5 creates a quarter-wavelength phase shift that changes linearly polarized light to circular. When the Terahertz radiation is absent, the circularly polarized light from the probe beam has two substantially identical intensity components which are separated by the Wollaston prism into two orthogonal, linearly polarized outgoing beams. Two photodetectors measure the two outgoing beams from the Wollaston prism and output the difference. When terahertz radiation is present, the probe beam becomes elliptically polarized and results in a difference being detected by detectors 7.

Figure 5D:
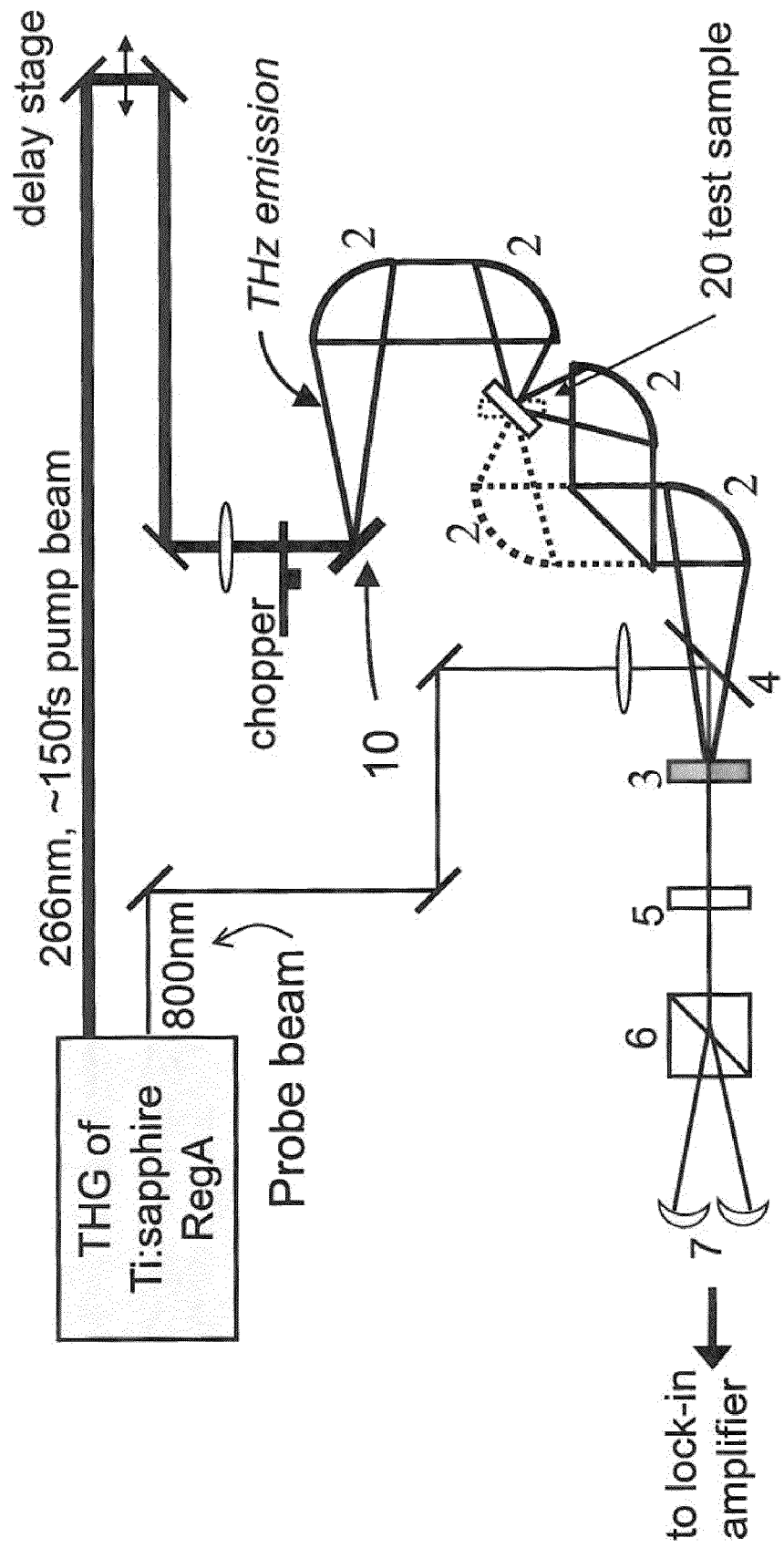
FIG. 5D is a schematic illustration of a preferred embodiment for producing and measuring terahertz emission from a crystal material 10 both reflected from and transmitted through a test sample.

FIG. 5C is a configuration which measures reflection of THz from a test sample 20. The test sample 20 can be in a gas, liquid or solid phase. The configurations described with respect to FIGS. 5A, 5B and 5C are merely exemplary and the scope of the invention is not limited to these particular embodiments. Moreover, the components of FIGS. 5A, 5B and 5C are illustrated as separated elements; however, one of ordinary skill in the art would appreciate that in practice the components of FIGS. 5A, 5B and 5C, with the exception of the test sample 20, would be assembled together to form an integral assembly. Each of the FIGS. 5A, 5B and 5C could form a separate embodiment. Alternatively, the components could be arranged to permit modification to accommodate the entry and analysis of the test samples 20. For example, a single assembly may be a composite of FIGS. 5B and 5C and, depending upon whether the test sample 20 will reflect or transmit terahertz radiation, the parabolic mirrors 2 and receiving elements 3, 4, 5, 6 and 7 of FIGS. 5B and 5C could be adjusted or relocated to accommodate the transmitted or reflected THz radiation. For example, the elements 3, 4, 5, 6 and 7 could be integrally mounted and the mirrors 2 could be adjustable to accommodate either transmitted or reflected terahertz radiation. Alternatively, two separate paths could be achieved by superimposing the two images of FIGS. 5B and 5C to create an apparatus as shown in FIG. 5D.

FIG. 6 is an illustration of the wurtzite structure observed in, inter alia, III-V nitride semiconductors, characterized by a highly polar material that can support a significant spontaneous polarization along the c or [0001] axis. Internal polarization is further enhanced in strained nitrides due to the piezoelectric effect. Terahertz emission using the principles of the present invention is dependent in part upon the orientation of the crystal lattice structure within the various samples 10, which in turn is defined relative to the c-plane or c-axis, a-plane and m-plane, all of which are represented in FIG. 6. For c-plane or (0001)-oriented wurtzite the growth is along the c-axis; and the c-axis is perpendicular to the growth plane. Non-(0001) orientated wurtzite occurs when the growth is not along the c-axis and the c-axis is not perpendicular to the growth plane; such as for example, m-plane (1$\bar{1}$00) wurtzite orientation.

Although various preferred embodiments of the present invention have been described herein in detail to provide for complete and clear disclosure, it will be appreciated by those skilled in the art that variations may be made thereto without departing from the spirit of the invention.

The terminology "outcoupling" as used herein refers to radiation going from one medium (such as a semiconductor) to another (such as air).

The term "projection" as used in the following claims refers to a mathematical model vector projection.

The terminology "in-plane" as used herein refers to a direction, such as carrier transport, lying in the surface plane of the polar crystal material.

The terminology polarization of the emitted THz radiation relates to the direction of the electric field vector of the propagating THz wave.

The terminology "nonsaturation region," used in relation to the pump power range, refers to the operation range in which there is a constant ratio of terahertz emission out per excitation photons inputted.

As used in the following claims, the term "device" is not intended to be limiting and includes an apparatus or system for producing terahertz radiation.

The terminology "layer" as used in the following claims is not intended to be limiting; including as to size or dimension. The "layer" as used in the claims may be part of a composite device or heterostructure composed of various regions or layers. The "layer" may be a part of an integral structure.

As used herein the diffusion current means the sum of the electron diffusion current and the hole diffusion current.

As used herein the terminology "Group II or Group III face" means the face of a crystal, entirely composed of Group II or Group III atoms.

As used herein, the terminology "photo-carriers" means carriers generated by photons or photogenerated carriers.

As used herein, the terminology "photo-current" means current due to photo-carriers.

As used herein, the terminology "heterostructure" means a structure of two different semiconductors in junction contact.

As used herein, the terminology "heterojunction" means the boundary between two different semiconductor materials, generally with a negligible discontinuity in the crystal structure.

It should be emphasized that the above-described embodiments are merely possible examples of implementations. Many variations and modifications may be made to the above-described embodiments. All such modifications and variations are intended to be included herein within the scope of the disclosure and protected by the following claims.

The invention claimed is:

1. A device for generating terahertz radiation comprising:
a plurality of layers of polar crystal material operative to emit terahertz radiation; the plurality of layers comprising transport layers and divider layers, the plane of the layers being not parallel to the polar axis, the interface between the transport layers and divider layers forming boundaries at which the internal electric polarization terminates leading to charges accumulating at the boundaries, and creation of internal electric fields oriented along the polar axis;
whereby when irradiated by a pulsed source of duration less than one picosecond, a time-varying and spatially nonuniform distribution of carriers is created in the growth direction of the polar crystal material thereby generating a first time-varying current due to diffusion of the carriers; the internal electric fields accelerating the carriers generated by the pulsed radiation source operating to produce a second time-varying current that is additive with the first time-varying current, thereby enhancing the generation of terahertz radiation.

2. The device of claim 1 wherein the direction of the first time-varying current due to diffusion is parallel to the polar axis and wherein the second time-varying current that is produced by the internal electric field is in the same direction as the first time-varying current.

3. The device of claim 1 wherein internal electric polarization comprises spontaneous and piezoelectric polarization and wherein the divider layers result in the termination of the spontaneous and piezoelectric internal electric polarization along the c-axis of the wurtzite material.

4. The device of claim 1 in which the divider layers are formed of a material that has a smaller band gap than the bandgap of the material forming the transport layers.

5. The device of claim 4 wherein the divider layers operate to collect background carriers thereby enhancing the first time-varying current due to diffusion and the second time-varying current produced by the internal electric field such that terahertz radiation is enhanced.

6. The device of claim 5 wherein the pulsed radiation source generates the carriers that create the first time-varying current and the time-varying Dember field produced by the first time-varying current is not screened by the presence of back ground carriers, the mitigation of the background carriers arising from the stacking of the divider and transport layers in the growth direction.

7. The device of claim 4 wherein the plurality of layers of polar crystal material comprises atoms from Group II or Group III and the growth of the crystal is terminated on face containing Group II or Group III atoms.

8. The device of claim 1 in which the divider layers are formed of a material that has a larger band gap than the bandgap of the material forming the transport layers.

9. The device of claim 8 wherein the plurality of layers of polar crystal material comprises atoms from Group V or Group VI and the growth of the crystal is terminated on face containing Group V or Group VI atoms.

10. The device of claim 1 wherein both the transport layers and divider layers are formed of wurtzite semiconductor material that is GaN, InN, AlN, or alloys thereof, or ZnO, MgO, ZnS, ZnSe, ZnTe, or alloys thereof.

11. The device of claim 1 wherein the orientation of the plurality of layers of polar crystal material layer is polar or semipolar.

12. The device of claim 1 wherein the pulsed source that the device is adapted to be used with is one of a pulsed light, electron, or ionizing particle source.

13. The device of claim 1 wherein thickness of the divider layers are in the range of one monolayer to several nanometers and the thickness of the transport layers is at least several nanometers and larger than the thickness of the divider layers.

14. A method generating terahertz radiation utilizing polar crystal material having a generally wurtzite crystal structure comprising:

growing transport and divider layers using a wurtzite polar crystal material such that the c-axis is perpendicular or has a projection perpendicular to the growth plane; the material forming the divider layers having a, different bandgap than the material forming the transport layers, the interface between the transport layers and divider layers forming boundaries at which the internal electric polarization terminates leading to charges accumulating at the boundaries, and creation of internal electric fields oriented along the polar axis;

irradiating the surface of the polar crystal material with a pulsed radiation source to create terahertz radiation; the pulsed radiation source creating carriers in the polar crystal material thereby generating a first time-varying current due to diffusion; the internal electric field accelerating the carriers to produce a second time-varying current that is additive with the first time-varying current.

15. The method of claim 14, wherein the step of irradiating the surface comprises propagating the pulsed radiation source of pulse duration less than one picosecond in a direction which is not normal to the surface of the device.

16. The method of claim 14 wherein the internal electric polarization in the growth direction of the polar crystal material of the transport layers is terminated by the divider layers, creating interfaces and charge accumulation at the interfaces leading to the occurrence of electric fields parallel to growth direction of the crystal, such that transport of carriers excited by pulsed radiation source proceeds parallel to the electric field, leading to a terahertz radiation.

17. The method of claim 14 wherein the combined plurality of transport and divider layers forms a heterostructure having a thickness of at least one absorption length of the exciting radiation; the heterostructure being grown by vapor deposition or epitaxy on a polar or semipolar substrate.

18. The method of claim 14 wherein the polar crystal material comprises wurtzite materials selected from the group of GaN, InN, AlN or alloys thereof, or ZnO, MgO, ZnS, ZnSe, ZnTe, or alloys thereof having a polar or semipolar orientation.

19. The method of claim 14 wherein the crystal material is irradiated using a pulsed radiation source with an energy in the approximate range of 1 to 25 nano-joules, a wavelength of 200-1800 nanometer, and a pulse duration in the approximate range of 10 to 300 femtoseconds, a pump beam spot size in the approximate range 0.5 to 2 millimeters, and an angle of incidence in the approximate range of 30 to 60 degrees, and wherein the subsequent terahertz emission is collected with a pair of parabolic mirrors onto an electro-optic crystal such as ZnTe for electro-optic sampling and wherein the ZnTe-based terahertz electro-optic detection system is polarization sensitive, enabling analysis of the polarization of the terahertz radiation.

20. A device for generating terahertz radiation comprising:

a heterostructure formed of polar crystal material operative to emit terahertz radiation; the heterostructure comprising transport regions and divider regions, the transport regions having a different bandgap than that of the divider regions, the interface between the transport regions and divider regions forming boundaries at which the internal electric polarization terminates leading to charges accumulating at the boundaries, and creation of internal electric fields in the transport regions oriented along the polar axis;

whereby when irradiated by a pulsed femtosecond light source, a time-varying and spatially nonuniform distribution of photo-carriers is created in the growth direction of the heterostructure thereby generating a first time-varying photo-current due to diffusion of the photo-carriers; the internal electric field accelerating the photo-carriers generated by the pulsed radiation source to produce a second time-varying photo-current that is additive with the first time-varying photo-current thereby enhancing generation of terahertz radiation.

* * * * *